United States Patent
Suzuki et al.

(10) Patent No.: US 9,262,209 B2
(45) Date of Patent: Feb. 16, 2016

(54) SCHEDULER, MULTI-CORE PROCESSOR SYSTEM, AND SCHEDULING METHOD

(71) Applicant: FUJITSU LIMITED, Kawasaki-shi, Kanagawa (JP)

(72) Inventors: Takahisa Suzuki, Kawasaki (JP); Koichiro Yamashita, Hachioji (JP); Hiromasa Yamauchi, Kawasaki (JP); Koji Kurihara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 333 days.

(21) Appl. No.: 13/761,866

(22) Filed: Feb. 7, 2013

(65) Prior Publication Data

US 2013/0160023 A1    Jun. 20, 2013

Related U.S. Application Data

(63) Continuation of application No. PCT/JP2010/063588, filed on Aug. 10, 2010.

(51) Int. Cl.
  *G06F 9/46* (2006.01)
  *G06F 9/48* (2006.01)
  *G06F 9/50* (2006.01)

(52) U.S. Cl.
  CPC ............ *G06F 9/48* (2013.01); *G06F 9/4812* (2013.01); *G06F 9/4887* (2013.01); *G06F 9/5027* (2013.01)

(58) Field of Classification Search
  CPC ... G06F 9/4881; G06F 9/4887; G06F 9/5027; G06F 9/4812; G06F 9/5033; G06F 2209/5018; G06F 13/24; G06F 9/48
  USPC .................................................. 718/102, 104
  See application file for complete search history.

(56) References Cited

U.S. PATENT DOCUMENTS

| | | | |
|---|---|---|---|
| 5,887,143 A | 3/1999 | Saito et al. | |
| 6,687,257 B1 * | 2/2004 | Balasubramanian | 370/429 |
| 7,571,342 B2 * | 8/2009 | Tanaka et al. | 713/600 |
| 7,913,256 B2 * | 3/2011 | Torii et al. | 718/102 |
| 2002/0078121 A1 * | 6/2002 | Ballantyne | 709/102 |
| 2002/0078124 A1 * | 6/2002 | Baylor et al. | 709/106 |
| 2003/0050954 A1 * | 3/2003 | Tayyar et al. | 709/102 |
| 2005/0027504 A1 | 2/2005 | Watanabe | |
| 2006/0069832 A1 | 3/2006 | Imaizumi | |
| 2009/0187915 A1 * | 7/2009 | Chew et al. | 718/104 |

FOREIGN PATENT DOCUMENTS

| | | |
|---|---|---|
| JP | 08-030562 A | 2/1996 |
| JP | 09-231183 A | 9/1997 |
| JP | 10-134030 A | 5/1998 |

(Continued)

*Primary Examiner* — Van Nguyen
*Assistant Examiner* — Jacob Dascomb
(74) *Attorney, Agent, or Firm* — Arent Fox LLP

(57) ABSTRACT

In an embodiment, a scheduler coordinates timings at which cores execute processes, for any two sequential processes to consecutively be executable. The processes are executed in order scheduled by the scheduler by concentrating on a specific core processes obstructing the consecutive execution such as an external interrupt and an internal interrupt. The scheduler does not always cause processes of another application to be executed during all standby time periods while the scheduler determines whether a length of a standby time period is shorter than a predetermined value, and does not cause any process of the other application to be executed when the length is shorter than that.

11 Claims, 23 Drawing Sheets

(56) References Cited

FOREIGN PATENT DOCUMENTS

| | | |
|---|---|---|
| JP | 2004-252728 A | 9/2004 |
| JP | 2005-049922 A | 2/2005 |
| JP | 2005-258920 A | 9/2005 |
| JP | 2006-099156 A | 4/2006 |

* cited by examiner

SCHEDULER, MULTI-CORE PROCESSOR SYSTEM, AND SCHEDULING METHOD

CROSS REFERENCE TO RELATED APPLICATIONS

This application is a continuation application of International Application PCT/JP2010/063588, filed on Aug. 10, 2010 and designating the U.S., the entire contents of which are incorporated herein by reference.

FIELD

The embodiments discussed herein are related to a scheduler, a multi-core processor system, and a scheduling method that are used when a multi-core processor executes an application.

BACKGROUND

Many techniques of effectively using a cache have conventionally been provided to improve the processing efficiency of a core. When a core executes a program, the core is allocated with processes constituting the program such as tasks or threads, each of a predetermined unit. The core sequentially executes the processes allocated thereto. A cache included in the core stores data that is used when the core executes the processes. Therefore, when processes that use related data are consecutively allocated to the core, the core can continuously use the data that are stored once in the cache.

On the contrary, when processes that data different from each other are consecutively allocated to the core, the core can not continuously use the data that is stored in the cache. Therefore, a cache-miss may occur. When a cache-miss occurs, the core reads the data necessary for the execution of the processes, from an external memory and stores the new data into the cache when necessary. Therefore, a longer processing time period is necessary compared to a case where the cache is continuously usable.

A technique is disclosed according to which cache-misses are reduced and the processing performance of the core is improved by coordinating in advance the order of executing processes, for the processes that use data stored in a cache to be consecutively executed (see, e.g., Japanese Laid-Open Patent Publication No. 2006-99156).

A technique is also disclosed according to which a process block formed by aggregating a group of processes that are executed using data common thereto is identified, by analyzing a program, dividing the program into plural blocks, and analyzing the relation between inputs and outputs of data among the blocks. For example, the data used when the identified process block is executed are highly related to each other and therefore, reduction of cache-misses can be expected by executing the scheduling for the data stored in the cache to be consecutively executed (see, e.g., Japanese Laid-Open Patent Publication Nos. H10-134030 and 2004-252728).

However, a limitation is present in suppressing occurrence of a cache-miss using the conventional techniques. For example, when the inputs-outputs relation of each of the process blocks is not one to one and data for plural process blocks are necessary for one process block, the same plural process blocks have to be executed and therefore, processes belonging to one same process block alone can not be executed consecutively. Similarly, when a program having complicated dependence relations is executed or when a highly prioritized process or an interrupt by an external process occurs, data different from that for the consecutively executed processes is highly likely to be used and therefore, occurrence of a cache-miss is inevitable.

FIG. 23 is an explanatory diagram of the conventional consecutive execution of processes. FIG. 23 depicts an example of operation of a CPU when the processes are consecutively executed using the conventional techniques. Processes 4, 8, 15, 19, 25, and 29 belonging to a single block are set to be consecutively executed using the conventional techniques.

However, in practice, an external interrupt occurs immediately after the process 4 (step S2301) and an internal interrupt process also occurs (step S2302) as depicted in FIG. 23. Therefore, data stored in a cache for execution of the process 4 is degraded by the processes at steps S2301 and S2302 (a state where other data is stored thereto). Therefore, a cache-miss occurs when the data of the cache is read to execute the process 8.

Similarly, though no interrupt process occurs between the processes 8 and 15, a standby time period occurs to wait for synchronization and a low priority process is executed during the standby time period (step S2303). Another high priority process interrupts and is executed between the processes 15 and 19 (step S2304). As a result, even when the program is analyzed and a setting is made for processes to be executed consecutively, the processes are often not consecutively executed in practice and a cache-miss may occur similarly to the conventional cases.

When a multi-core processor is used that has recently become widely prevalent, an interrupt can be prevented by causing a specific core to execute processes not set such as those at steps S2301 to S2304 of FIG. 23. However, when the multi-core processor is used, one program is efficiently executed and therefore, the process blocks executable in parallel are allocated to different cores for execution.

Therefore, a case may be present where a core #0 executes the process 1 included in an application and another core (for example, a core #1) executes one of the other processes that precede the process 1. In this case, when no other executable process block is present for the core #0, the core #0 has to stand by until the preceding processes executed by the core #1 come to an end.

In an ordinary operating system, during execution of an application, plural applications are often simultaneously executed that have no relation with the application under execution. Therefore, in the operating system, when a standby time period occurs like in the case of the core #0, the processes of the other applications are executed to effectively use the function of the core #0.

In this case, it seems that the processes using the shared data are consecutively executed for each application. However, in practice, the processes of the other applications are executed during the standby time period and therefore, a problem arises in that cache-misses increase.

Setting can be made not to execute any other application during the standby time period. However, as a result of such a setting, the operation of the core is unconditionally stopped during the standby time period. Therefore, a problem arises in that the performance of the entire system is degraded.

SUMMARY

According to an aspect of an embodiment, a scheduler causes a specific core in a multi-core processor to execute a process that includes first detecting from a group of processes constituting a program to be executed, a group of unset scheduling processes whose group of subsequent processes is common; second detecting for each of the unset scheduling processes of the detected group of unset scheduling processes and from group of preceding processes for the unset scheduling processes, a preceding process belonging to a group to which the unset scheduling processes belong, the group being among groups formed by grouping the processes that share same or related data to be accessed; allocating the unset scheduling processes respectively to a core in the multi-core processor and to which the detected preceding process is allocated; calculating, for each of the unset scheduling processes, elapsed time of an execution time period of the unset scheduling process from an execution ending time at which the group of preceding processes for the unset scheduling processes completely ends; and setting, for each of the allocated unset scheduling processes, an execution starting time of the unset scheduling process at an allocation destination core to be a difference of a most recent calculated elapsed time less an execution time period of the unset scheduling process.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Preferred embodiments of the present invention will be explained with reference to the accompanying drawings.

Figure 1:
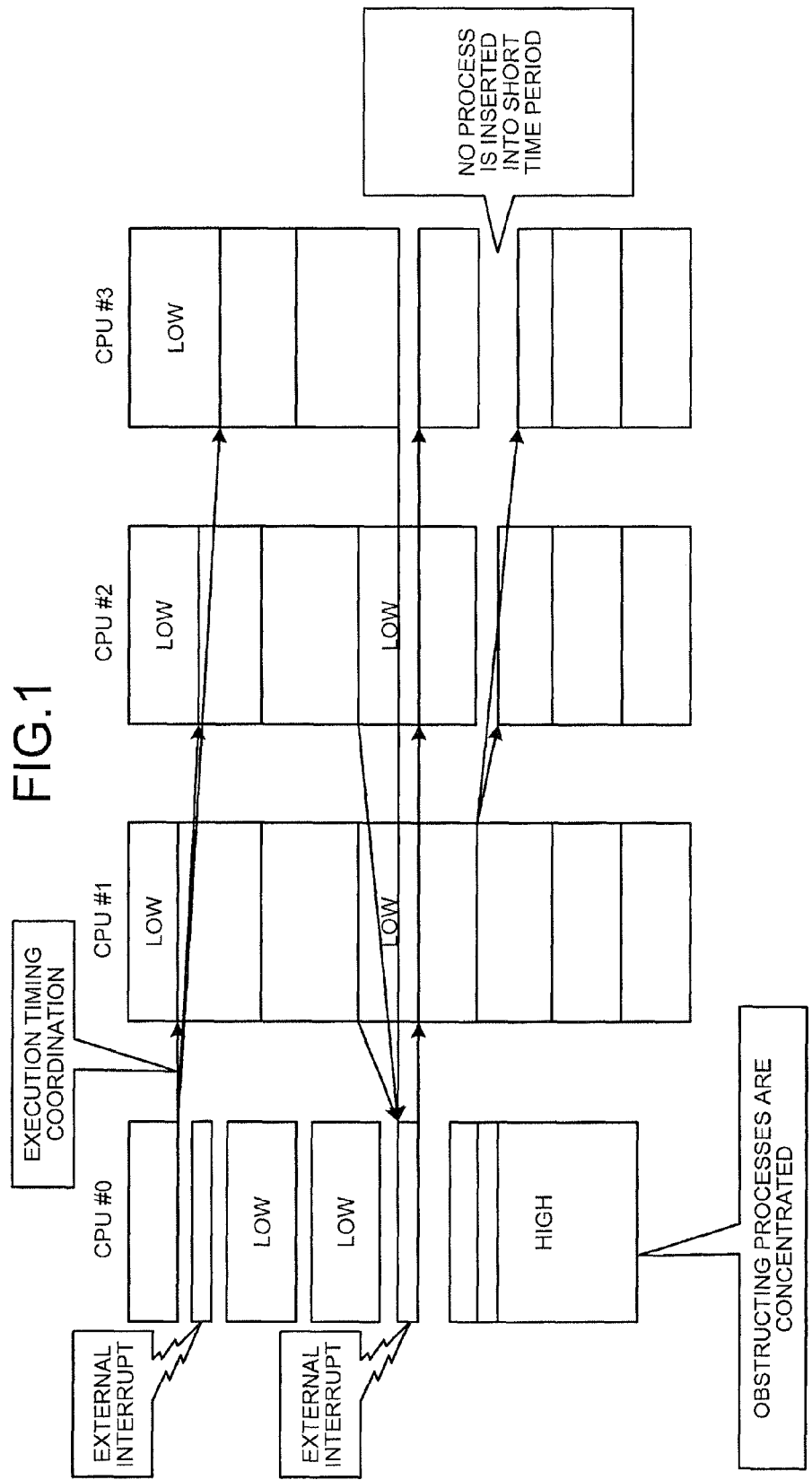
FIG. 1 is an explanatory diagram of an example of a scheduling process according to an embodiment.

FIG. 1 is an explanatory diagram of an example of a scheduling process according to the embodiment. In the embodiment, reduction of cache-misses and maintenance of the processing efficiency of a core are concurrently achieved by reducing the number of occurrences of the standby time period that occurs during the conventional consecutively execution.

For example, the reduction of cache-misses and the maintenance of the processing efficiency of the core are concurrently established by the following three processes.

(1) Causing a same core to consecutively execute two sequential processes by coordinating the execution timings.

(2) Causing a specific core to collectively execute processes that obstruct the consecutive execution.

(3) Not including the other processes among those to be executed even when a standby time period occurs and the standby time period is short.

Similar to the conventional techniques, in the embodiment, a group of processes included in a program to be executed by a multi-core processor is divided in advance into groups each including processes that use related data. For example, processes 1 to 10 are divided into groups 1 to 3 respectively including the processes that use related data when the processes are executed. Therefore, as depicted in FIG. 1, among four cores including CPUs #0 to #3 constituting a multi-core processor system: the CPU #1 is allocated with processes belonging to the group 1; the CPU #2 is allocated with processes belonging to the group 2; and the CPU #3 is allocated with processes belonging to the group 3.

In the embodiment, timings for each of the cores to execute the processes are coordinated such that any two sequential processes can be consecutively executed (the process of (1) above). For example, in the embodiment, the execution time period is estimated in advance at the time of the design for each of the processes that are executed using data common thereto, that is, the processes whose execution can continuously use the data stored in the cache. In the embodiment, the timings to execute the processes are coordinated based on the execution time periods of the processes, the inputs-outputs relation of each of the process blocks, and information concerning the groups that each share the data, such that the number of occurrences of the standby time period is reduced as low as possible.

In the embodiment, the processes are executed in the order that is scheduled by the scheduler by concentrating processes on a specific core such as processes obstructing consecutive execution like an external interrupt and an internal interrupt (the process of (2) above). For example, in FIG. 1, the CPU #0 is used as a core dedicated to execution of the processes that obstruct the consecutive execution. The core #0 is allocated with processes that do not belong to any group and processes that have no information concerning any group appended thereto as processes to be executed in addition to the external and the internal interrupt processes. Therefore, the core #0 prevents a case where the interrupt processes are allocated to the cores #1 to #3 and the cores #1 to #3 are execute the designated processes at the timings according to the schedule.

In the embodiment, when another core executes processes having a dependence relation, a standby time period may also occur by the time when the processes come to an end. However, in the embodiment, processes of another application are not executed in all the standby time periods as are in the conventional case but it is determined whether each of the processes of the other application is to be executed, based on the determination as to whether the length of each of the standby time periods is shorter than a predetermined value. For example, when it is determined that the length of the standby time period is shorter than the predetermined value, the processes of the other application are not executed (the process of (3) above). Therefore, even when a standby time period occurs, the cores do not always execute other processes. As a result, the number of occurrences of the cache-miss caused by the execution of the other processes is reduced. When it is determined that the standby time period is longer than the predetermined value, another process is executed using the standby time period and therefore, the processing efficiency of the core can also be maintained.

As described, application of the scheduling process according to the embodiment causes the processes using data stored in the cache to be executed and therefore, the number of occurrences of a cache-miss is reduced. Consequently, the cache can be effectively used and the processing performance of the core can be improved. An example of a configuration and an example of processing by the scheduler will be described below that realizes the scheduling process according to the embodiment.

Figure 2:
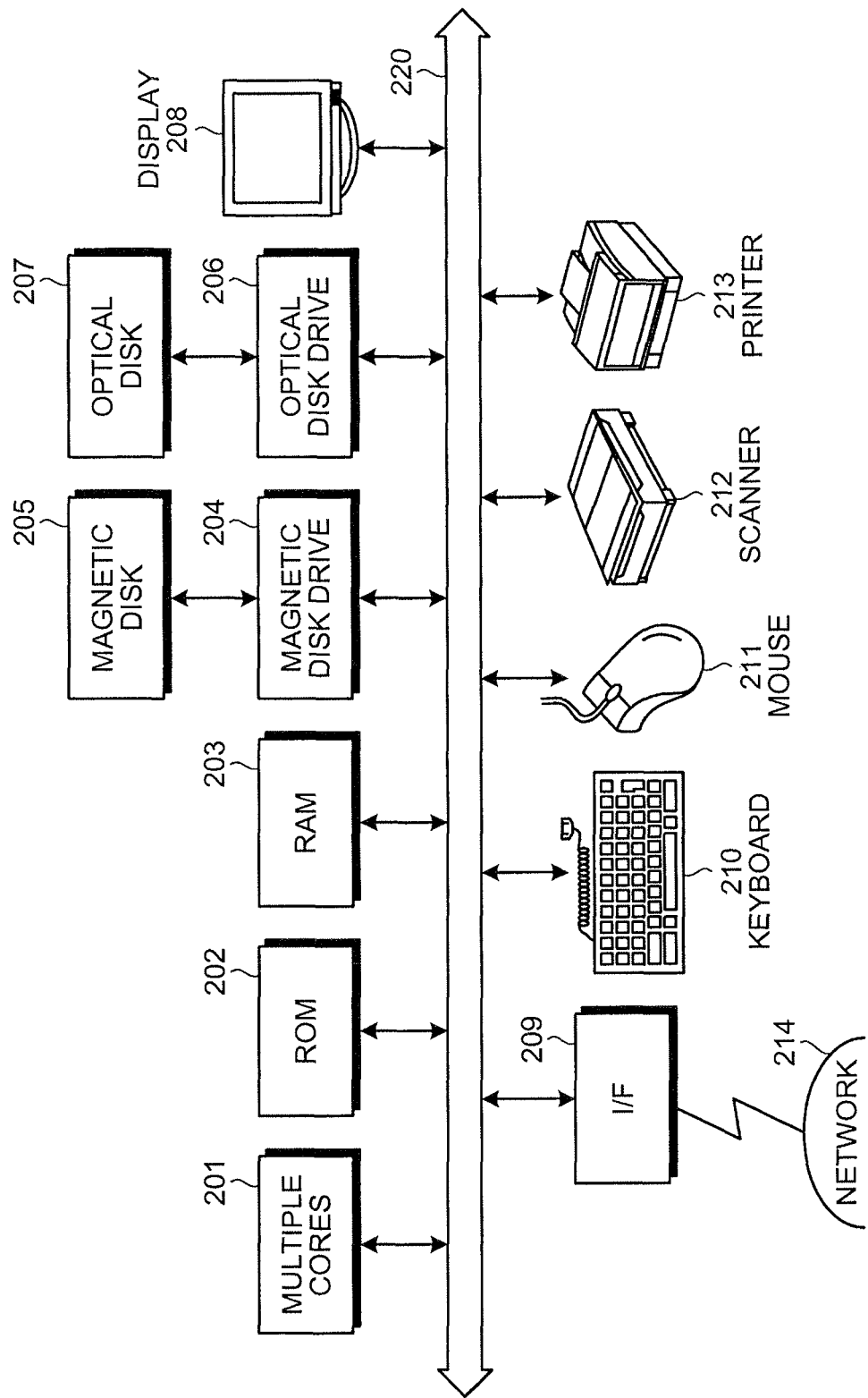
FIG. 2 is a block diagram of a hardware configuration of a multi-core processor system according to the embodiment.

FIG. 2 is a block diagram of a hardware configuration of a multi-core processor system according to the embodiment. As depicted in FIG. 2, the multi-core processor system includes multiple cores 201, a read-only memory (ROM) 202, a random access memory (RAM) 203, a magnetic disk drive 204, a magnetic disk 205, an optical disk drive 206, an optical disk 207, a display 208, an interface (I/F) 209, a keyboard 510, a mouse 511, a scanner 512, and a printer 513, respectively connected by a bus 200.

The multiple cores are constituted by n central processing units (CPUs) and govern overall control of the multi-core processor system. The ROM 202 stores therein various types of programs such as a boot program and a scheduler for implementing scheduling management. The RAM 203 is used as a work area of the CPUs 201. The magnetic disk drive 204, under the control of the CPUs 201, controls the reading and writing of data with respect to the magnetic disk 205. The magnetic disk 205 stores therein data written under control of the magnetic disk drive 204.

The optical disk drive 206, under the control of the CPUs 201, controls the reading and writing of data with respect to the optical disk 207. The optical disk 207 stores therein data written under control of the optical disk drive 206, the data being read by a computer.

The display 208 displays, for example, data such as text, images, functional information, etc., in addition to a cursor, icons, and/or tool boxes. A cathode ray tube (CRT), a thin-film-transistor (TFT) liquid crystal display, a plasma display, etc., may be employed as the display 208.

The I/F 209 is connected to a network 514 such as a local area network (LAN), a wide area network (WAN), and the Internet through a communication line and is connected to other apparatuses through the network 514. The I/F 209 administers an internal interface with the network 514 and controls the input/output of data from/to external apparatuses. For example, a modem or a LAN adaptor may be employed as the I/F 209.

The keyboard 510 includes, for example, keys for inputting letters, numerals, and various instructions and performs the input of data. Alternatively, a touch-panel-type input pad or numeric keypad, etc. may be adopted. The mouse 511 is used to move the cursor, select a region, or move and change the size of windows. A track ball or a joy stick may be adopted provided each respectively has a function similar to a pointing device.

The scanner 512 optically reads an image and takes in the image data into the multi-core processor system. The scanner 512 may have an optical character reader (OCR) function as well. The printer 513 prints image data and text data. The printer 513 may be, for example, a laser printer or an ink jet printer.

Figure 3:
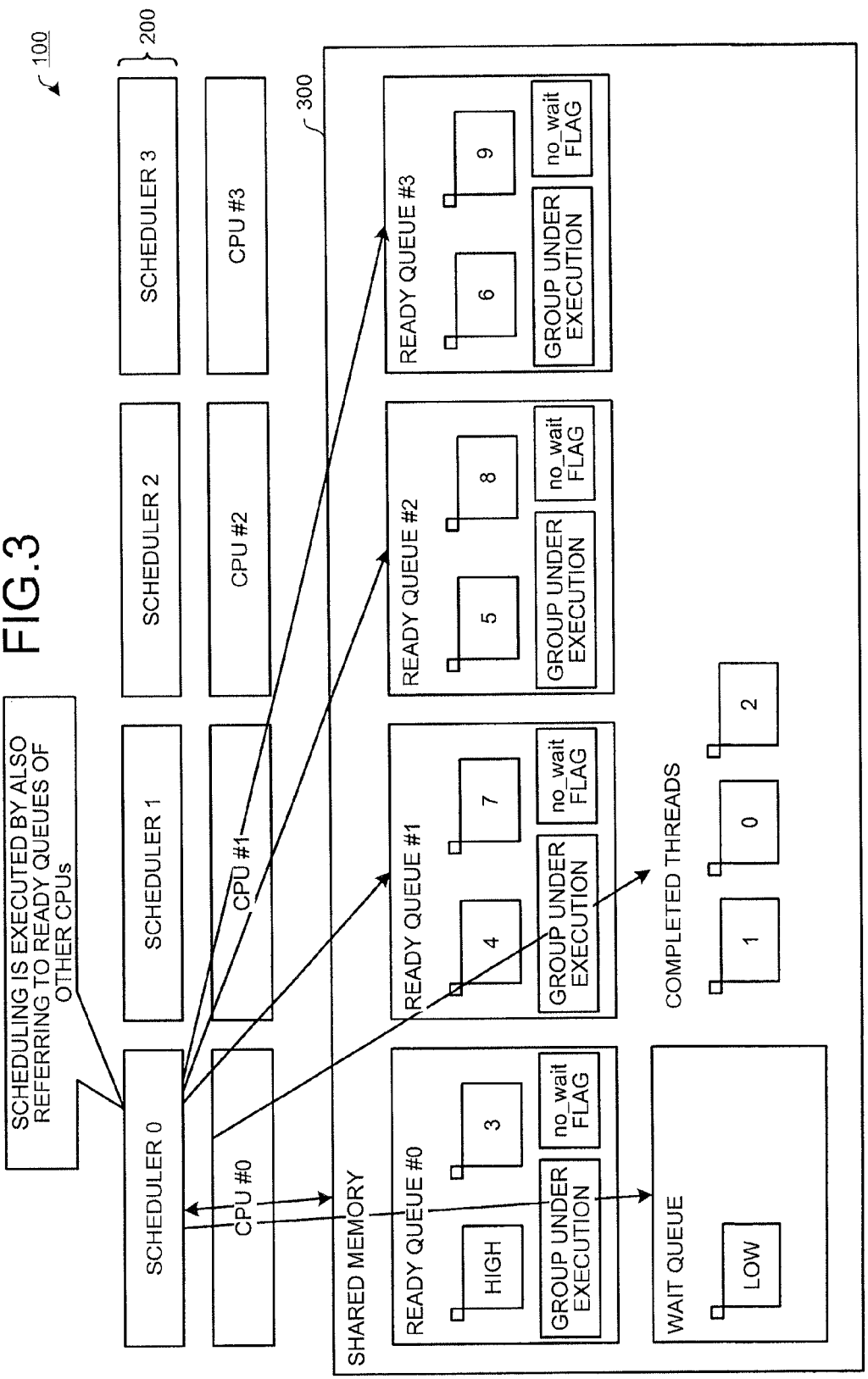
FIG. 3 is a diagram of an example of queue allocation executed by a multi-core processor system.

FIG. 3 is a diagram of an example of queue allocation executed by the multi-core processor system. As depicted in FIG. 3, the multi-core processor system 100 prepares for each of the CPUs a scheduler 200 that is a program dedicated to the scheduling process; and using the scheduler 200 of the specific core among the four cores, allocates a group of processes constituting the program to be executed.

In FIG. 3, among the schedulers 200 prepared for the CPUs, the scheduler 0 of the CPU #0 allocates to the cores, the group of processes constituting the program to be executed. The result of the scheduling (which core and at which timing, a process is executed) by the scheduler 0 is stored to a ready queue for each of the cores.

In the multi-core processor system 100 depicted in FIG. 3, the ready queue is prepared in shared memory 300 of the cores. The shared memory 300 is realized using, for example, the ROM 202, the RAM 203, the magnetic disk 205, and the optical disk 207 of FIG. 2. A process saved to the ready queue is executed by the scheduler 200 of the CPU.

Figure 4:
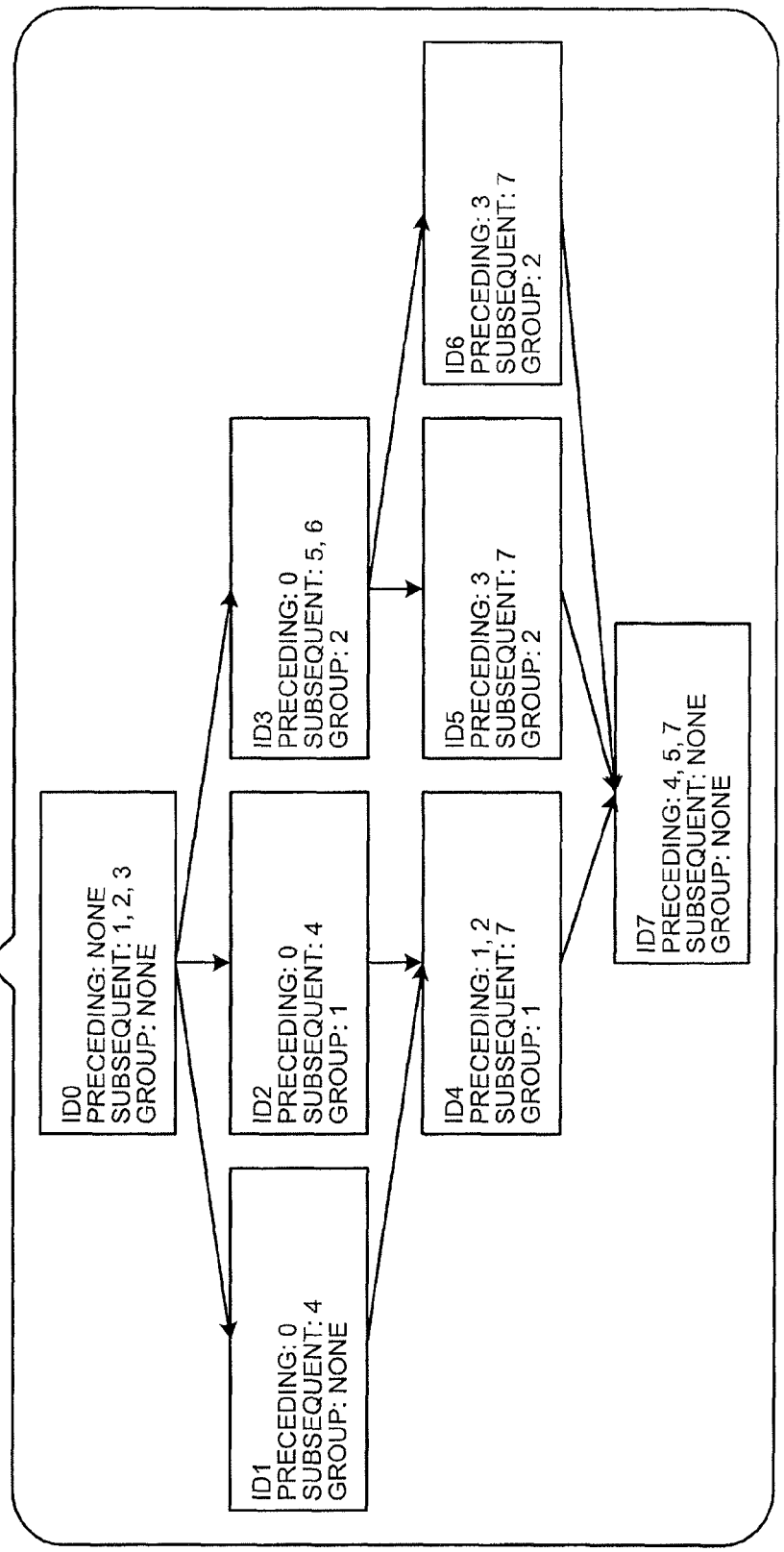
FIG. 4 is an explanatory diagram of an example of a program with dependence information.

FIG. 4 is an explanatory diagram of an example of a program with dependence information. In the embodiment, the dependence information is appended to each of the processes of the group of processes constituting the program. Although the data configuration of the dependence information is not especially limited, the dependence information includes the group to which a process belongs, a preceding process having a dependence relation with the process, a subsequent process having a dependence relation with the process, and an execution time period of the process, as the contents of the information.

The data configuration of thread information 401 will be described with reference to FIG. 4 depicting the dependence information appended to each thread 400, which is an example of the unit of processing. The thread information 401 includes information as indicated below.

Thread ID: Identification information of a thread Preceding Thread ID List: Identification information of preceding thread having dependent relation Subsequent Thread ID List: Identification information of subsequent thread having dependent relation Consecutive Execution Group ID: Identification information of a group of threads can be consecutively executed without any cache-miss
Estimated Execution Time Period: Estimated value of a time period necessary for execution
Elapsed Time Period: Elapsed time period consumed for execution (varies depending on the state of the actual execution)

The scheduler 200 uses the thread information 401 and thereby, can identify the execution order of and the dependence relations among threads ID0 to ID7.

Figure 5:
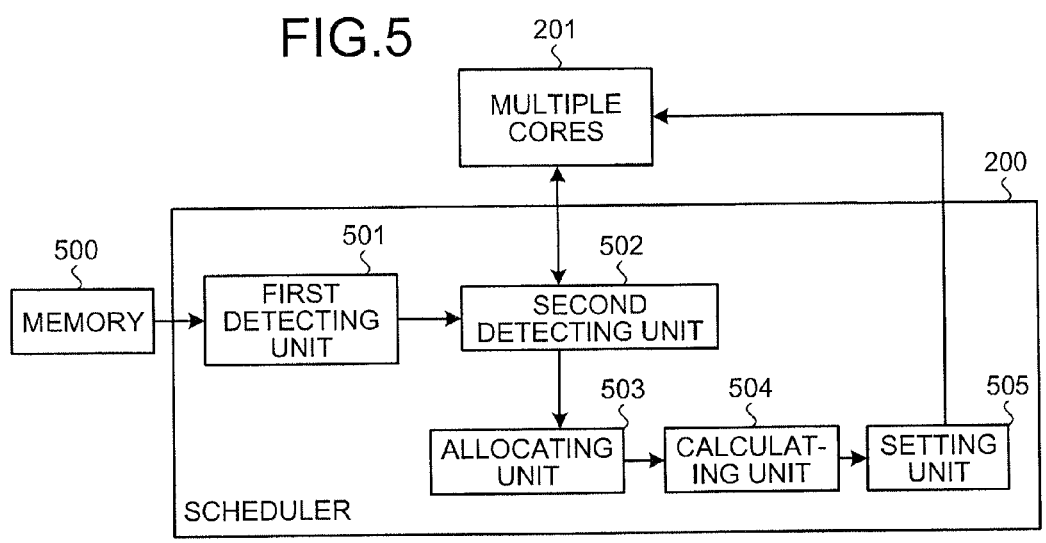
FIG. 5 is a block diagram of an example of a functional configuration of a scheduler.

FIG. 5 is a block diagram of an example of a functional configuration of the scheduler. The scheduler 200 includes a first detecting unit 501, a second detecting unit 502, an allocating unit 503, a calculating unit 504, and a setting unit 505. These functions forming a control unit (the first detecting unit 501 to the setting unit 505) are implemented by, for example, executing on a specific CPU among the multiple cores 201, programs stored in a storage device such as the ROM 202, the RAM 203, the magnetic disk 205, and the optical disk 207 depicted in FIG. 2, or using the I/F 208. Memory 500 is implemented by a storage device such as the ROM 202, the RAM 203, the magnetic disk 205, and the optical disk 207 depicted in FIG. 2 or an external storage device, and stores the program to be executed.

The first detecting unit 501 has a function of detecting a group of processes that satisfy a specific condition from among groups of processes constituting the program to be executed. For example, the first detecting unit 501 detects from the program to be executed and stored in the memory 500, groups of unset scheduling processes having a common group of subsequent processes. The "groups of unset scheduling processes" are processes that are among the groups of processes constituting the program to be executed, and exclusive of the processes that are not executed by the multi-core processor system 100 and the processes whose execution timings are already set by the scheduling.

For example, a case will be described where, for some unset processes (the processes 4, 5, and 6): the processes 10 and 11 are set as the subsequent processes of the process 4; the processes 10 and 11 are set as the subsequent processes of the process 5; and the processes 9 and 12 are set as the subsequent processes of the process 6. When the above setting is made, the first detecting unit 501 detects the processes 4 and 5 as a group of unset processes. The detected group of unset processes is stored to a storage area such in the RAM 203, the magnetic disk 205, and the optical disk 207.

The second detecting unit 502 has a function of detecting groups of processes that satisfy a specific condition from the group of unset processes detected by the first detecting unit 501. For example, the second detecting unit 502 detects for each of the unset processes, preceding processes that belong to the same group.

For example, noting an unset process (the process 5), the processes 1, 2, and 3 are set in the dependence information as preceding processes. If the process 5 belongs to the group 1, the second detecting unit 502 detects the processes that belong to the group 1, among the processes 1, 2, and 3.

The processes belonging to the group 1 may be included depending on the content of the unset processes constituting the group of unset processes. However, in this case, the second detecting unit 502 detects all the processes. On the contrary, no process belonging to the group 1 may be included in the group of unset processes. In this case, the second detecting unit 502 acquires a detection result indicating that no preceding process is present. The detection result is stored to a storage area such as the RAM 203, the magnetic disk 205, and the optical disk 207.

The allocating unit 503 has a function of allocating the unset processes to the cores to execute the unset processes. For example, the allocating unit 503 allocates the unset processes to the core to which the preceding processes detected by the second detecting unit 502 are allocated, among the cores in the multi-core processor 201.

For example, it is assumed that the second detecting unit 502 detects, as a preceding process of an unset process (the process 5), the process 1 belonging to the group 1 that is same as that of the process 5. The allocating unit 503 executes the allocation process to cause the core that executes the process 1, to execute the process 5. When the process 1 is allocated to the core #2, the allocating unit 503 allocates the process 5 to the core #2.

When the allocation process for the process 5 is executed, the process 1 that is a preceding process thereof may already come to an end. Therefore, the allocating unit 503 allocates a core to execute the process 5 by referring to the past allocation processes. The allocation result is stored to a storage area such as the RAM 203, the magnetic disk 205, and the optical disk 207.

The calculating unit 504 has a function of calculating for each of the unset processes, the process ending time when the process is actually executed. For example, the calculating unit 504 calculates the time that elapses during the execution time period of the unset process from an execution ending time at which the group of preceding processes of the unset process completely end.

For example, when the calculating unit 504 calculates the process ending times of unset processes (the processes 4 and 5), the process starting time of the unset processes is the time that is the most recent time among the ending times of the preceding processes. When the process 4 is started at the most recent time among the ending times of the preceding processes of the process 4, the time at which the execution time period of the process 4 (for example, the estimated execution time period set in the thread information 401 of FIG. 4) elapses is the process ending time of the process 4. Similarly, the calculating unit 504 also calculates the process ending time of the process 5. The calculation result is stored to a storage area such as the RAM 203, the magnetic disk 205, and the optical disk 207.

The setting unit 505 has a function of setting for each unset process allocated by the allocating unit 503 to any one of the cores, the execution starting time in the allocation destination core for the unset process. For example, the setting unit 505 sets the difference of the most recent time among the process ending times calculated by the calculating unit 504 less the execution time period of the unset process to be the execution starting time of the unset process.

For example, it is assumed that the calculating unit 504 calculates process ending times T4 and T5 of the processes 4 and 5. When the process ending times T4 and T5 are T4>T5 (meaning that T4 is more recent than T5), the execution starting times thereof are set such that the processes 4 and 5 both come to an end at T4. Therefore, the setting unit 505 sets the difference of T4 less the execution time period of the process 4 to be the execution starting time period of the process 4. Similarly, the setting unit 505 sets the difference of T4 less the execution time period of the process 5 to be the execution starting time of the process 5.

According to the above procedure, the processes 4 and 5 simultaneously come to an end at the time T4. The processes 4 and 5 have a common group of subsequent processes as a condition for the detection by the first detecting unit 501. Therefore, because the preceding processes simultaneously come to an end, the group of subsequent processes can be executed successively after the preceding processes (in this case, the processes 4 and 5) at the time T4.

When an execution ending time (for example, T4) is present at which the group of preceding processes of the unset process completely comes to an end, the setting unit 505 sets the execution ending time T4 to be the execution starting time of the unset process.

As described, when an unset process immediately becomes executable after a preceding process comes to an end that is executed by the core executing the unset process, the setting unit 505 sets the execution starting time of the unset process such that the unset process and the preceding process are consecutively executed. On the contrary, when an unset process does not immediately become executable after a preceding process comes to an end that is executed by the core executing the unset process, the setting unit 505 sets the execution starting time of the unset process such that the unset process and a subsequent process thereof are consecutively executed.

The above exemplary setting is the most basic procedure. However, various operation states can be assumed for the group of unset processes corresponding to the settings of the preceding process and the subsequent process and the setting of the group to which the unset process belongs. Therefore, the difference in the processing will be described between the allocating unit 503 and the setting unit 505 corresponding to the difference in the operation state.

An operation state will be described where the second detecting unit 502 can not detect any preceding process that belongs to the group to which the unset process belongs. In this operation state, the allocating unit 503 allocates the unset process whose preceding process is not detected, to a core to which no preceding process is allocated among the multiple cores 201. The allocating unit 503 allocates the unset process to the core that is in an empty state with no process allocated thereto.

An operation state is also assumed where the second detecting unit 502 detects no preceding process that belongs to the group to which the unset process belongs as above and no core in an empty state is present. In this operation state, the allocating unit 503 allocates the unset process to a core by which the execution time period of the preceding process already allocated thereto becomes the shortest, among the multiple cores 201. The setting unit 505 allocates the unset process to a core whose processing load is the lowest.

Another example can be a state where a priority level concerning the execution order is set in the unset process. When the priority level is set, the allocating unit 503 preferentially allocates to the core to which the preceding processes detected by the second detecting unit 502 are allocated, the unset process whose priority level is set to be high among the unset processes.

An operation state is assumed as yet another example where interrupt processes occurring due to the program to be executed and a program other than the program to be executed are the unset processes. In this operation state, the allocating unit 503 allocates the unset process to a core for which the second detecting unit 502 detects no preceding process belonging to the group to which the unset process belongs.

The allocating unit 503 allocates the unset process occurring due to the interrupt process to a core different from the core to which a preceding process belonging to each group is allocated. When the preceding process belonging to each group is allocated to all the cores, the allocating unit 503 allocates the unset process occurring due to the interrupt process to the core for which the execution time period of the preceding process already allocated thereto is the shortest among the multiple cores 201.

The allocating unit 503 allocates to the core from which no preceding process is detected by the second detecting unit 502, a process including no information to identify the group of subsequent processes and the group of preceding processes such as the thread information 401. The allocating unit 503 allocates to a core in an empty state with no preceding process allocated thereto, the process to which the thread information 401 is not appended. In this case, when no core is present that is in an empty state, the allocating unit 503 also allocates the process to which the thread information 401 is not appended, to the core for which the execution time period of the preceding process already allocated thereto is the shortest of the multi-core processor 201.

Figure 6:
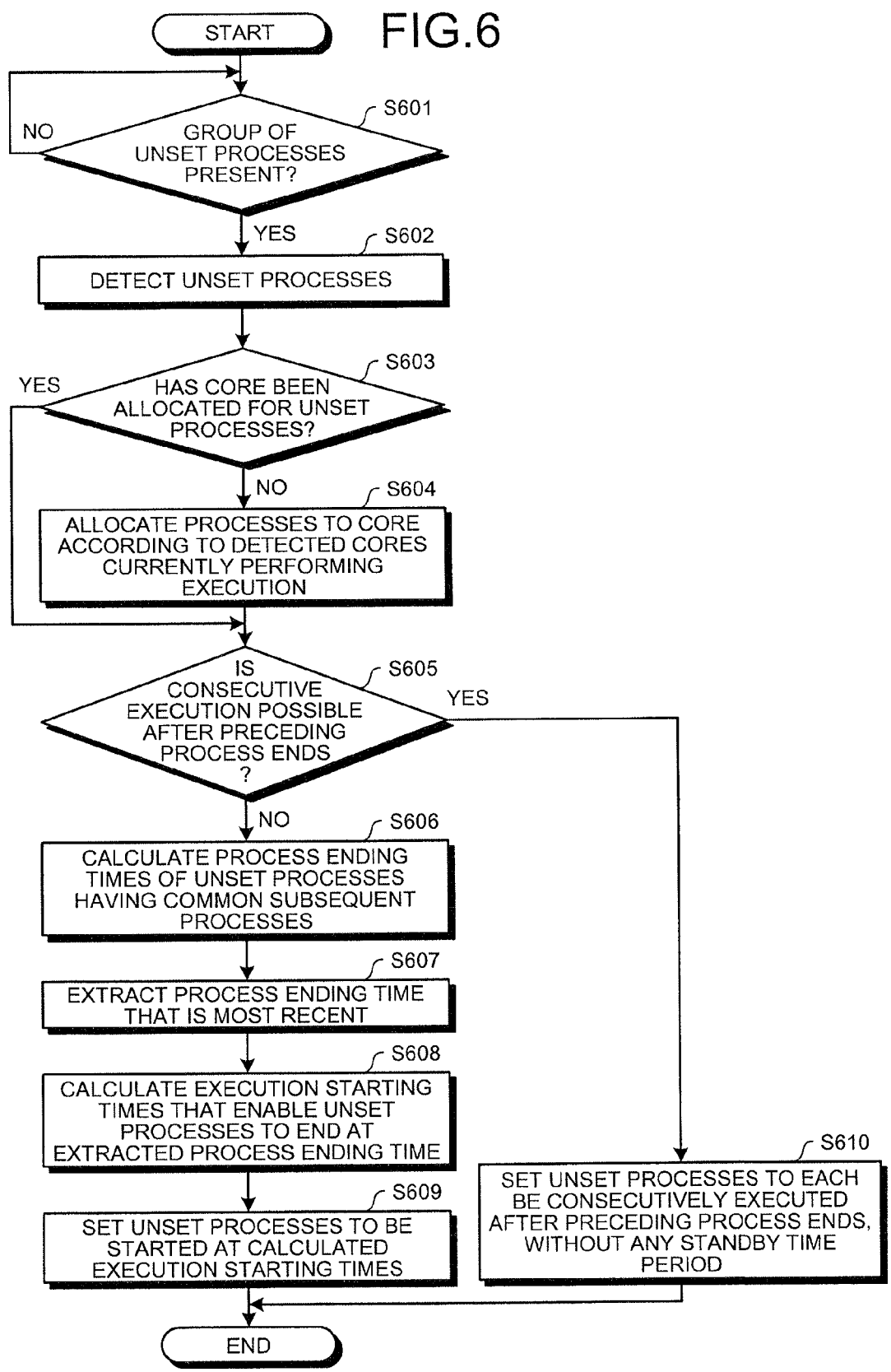
FIG. 6 is a flowchart of a procedure for the scheduling process.

FIG. 6 is a flowchart of a procedure for the scheduling process. The flowchart of FIG. 6 describes a procedure up to the setting by the scheduler 200 of the timing for each core of the multiple cores 201 to execute the group of processes included in an application to be executed. Execution of the operations of FIG. 6 enables the scheduler 200 to execute each of the unset processes for which no execution timing is set, at a timing that enables the unset process to consecutively be executed with the preceding process or the subsequent process having a dependence relation therewith.

In FIG. 6, using the first detecting unit 501, the scheduler 200 determines whether among the groups of processes constituting a program to be executed, a group of unset processes to be executed and stored in the memory 500 is present (step S601). The scheduler 200 is set to be in a standby state at step S601 until determining that a group of unset processes is present (step S601: NO) and when the scheduler 200 determines that a group of unset processes is present (step S601: YES), the scheduler 200 detects unset processes using the first detecting unit 501 (step S602).

The scheduler 200 determines whether a core has been allocated for the unset processes detected at step S602 (step S603). If the scheduler 200 determines at step S603 that no core is allocated for the unset processes (step S603: NO), the scheduler 200 executes an allocation process for the core to execute the unset processes. For example, using the allocating unit 503, the scheduler 200 allocates the processes to the core according to the result of the detection by the second detecting unit 502 executed for the core currently performing execution (step S604).

If the scheduler 200 determines at step S603 that a core is allocated for the unset processes (step S603: YES), the scheduler 200 progresses to the operation at step S605 without executing any other operations because no allocation process by the allocating unit 603 is necessary.

The scheduler 200 determines whether after the preceding process comes to an end, consecutive execution is possible, based on the ending time of each of the preceding processes of the unset processes (step S605). "Consecutive execution is possible" means the state where the unset process can be executed without including any sandwiched standby time period after the preceding process executed by the same core as that for the unset process, comes to an end, i.e., the state for the core to be caused to execute where the preceding process executed by another core already comes to an end.

If the scheduler 200 determines at step S605 that consecutive execution is not possible (step S605: NO), the scheduler 200 executes the scheduling to enable consecutive execution of the unset process with the subsequent process. Therefore, using the calculating unit 504, the scheduler 200 calculates the process ending times of the unset processes whose subsequent processes detected by the first detecting unit 501 are common (step S606).

The scheduler 200 extracts the process ending time that is the most recent among the process ending times calculated at step S606 (step S607) and calculates the execution starting times that enable the unset processes to end at the process ending time extracted at step S607 (step S608).

Thereafter, using the setting unit 505, the scheduler 200 sets the unset processes to be started at the execution starting times calculated at step S608 (step S609) and causes the series of operations to come to an end.

On the other hand, if the scheduler 200 determines at step S605 that the consecutive execution is possible (step S605: YES), the scheduler 200 executes scheduling to enable the unset processes each to be consecutively executed with the preceding process. Therefore, using the setting unit 505, the scheduler 200 sets the unset processes to each be consecutively executed after the preceding process comes to an end without any standby time period (step S610) and causes the series of operations to come to an end.

Figure 7:
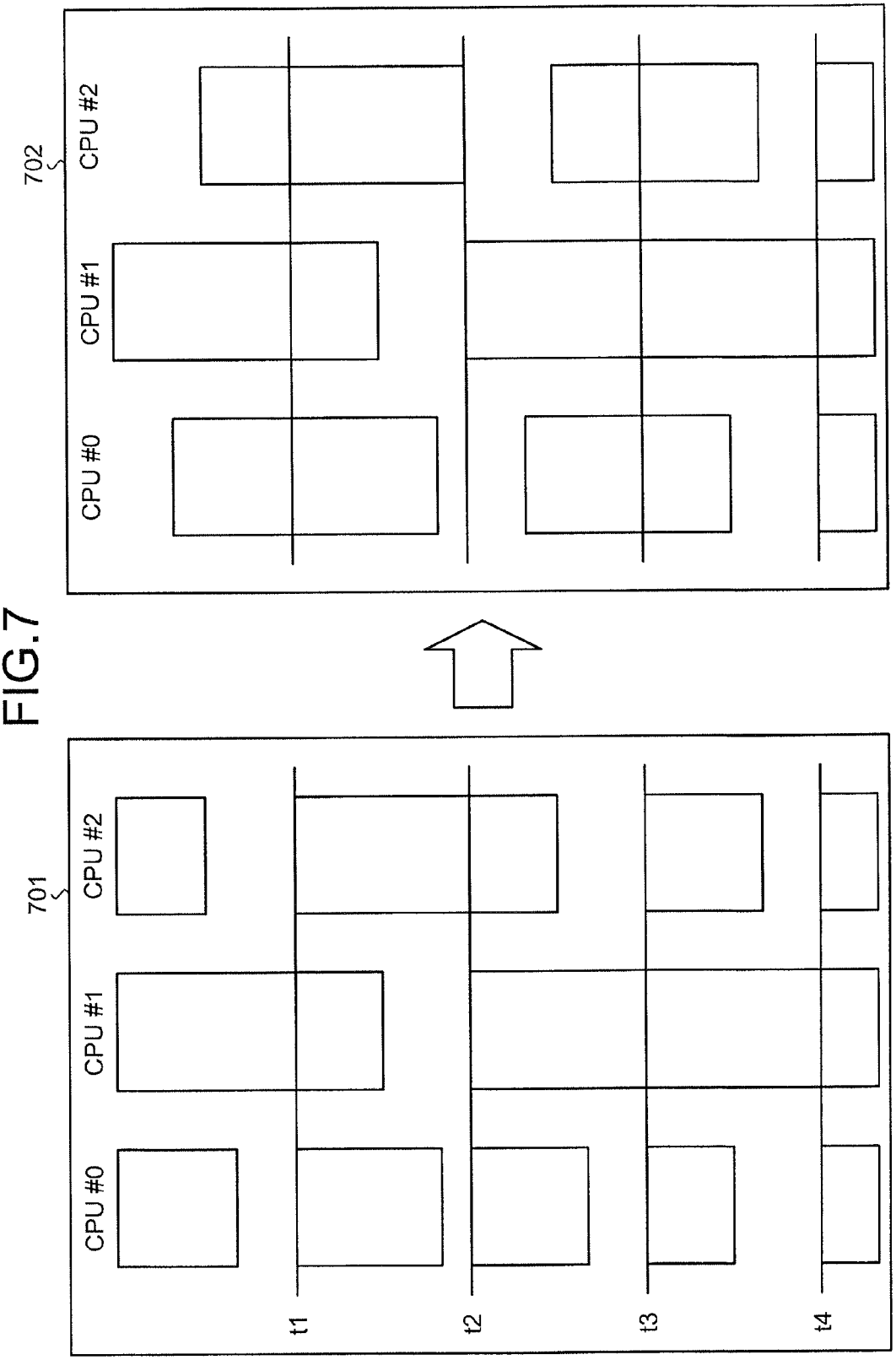
FIG. 7 is a diagram of an example of scheduling that uses the scheduling process.

FIG. 7 is a diagram of an example of scheduling that uses the scheduling process. The scheduling 701 of FIG. 7 represents a case where the conventional scheduling process is executed and scheduling 702 represents a case where the scheduling process of the scheduler 200 is executed. In both of the scheduling 701 and 702: the CPU #0 executes the processes that belong to the group 1; the CPU #1 executes the processes that belong to the group 2; and the CPU #2 executes the processes that belong to the group 3.

In the conventional scheduling process represented by the scheduling 701, a standby time period occurs for each of the processes until the time (t1 to t4) that is the most recent among the ending times of the preceding processes executed by another core.

On the other hand, in the scheduling process of the scheduler 200 represented by the scheduling 702, the scheduling is executed for each of the processes to be consecutively executed with at least any one among the preceding process and the subsequent process. Therefore, even when the same number of processes are executed, the number of occurrences of the standby time period is significantly reduced.

Even in a case where a standby time period occurs, if the standby time period is shorter than a predetermined value, no scheduling is executed that causes a process of another application to be executed during the standby time period. Therefore, each of the cores can use for a long time, the data stored in the cache and therefore, can improve processing efficiency.

An example of the scheduler 200 will be described. In the example, threads are implemented as units of processing. A "thread" is a smallest processing management unit in an operating system. A thread usually has information appended thereto such as the identification information, the starting time, the operating time period, and the priority level of the thread as management information for the operating system to manage the thread.

In the example, in addition to the usual management information, further information is appended to the thread such as the thread information as an identification information list on the preceding threads that are the threads to precede the thread, an identification information list on the subsequent threads that are the threads that are subsequent to the thread, group identification information, and the execution time period of the thread (for example, the estimated processing time period).

A "preceding thread" refers to a thread that produces the data to be an input of a given thread in the input-output relation between threads and, when all the preceding threads comes to an end, the given thread to be executed becomes executable. On the contrary, a "subsequent thread" is a thread that receives, as input, data generated by the given thread.

"Group identification information" is information indicating a set of threads that share the related data identified by analyzing the program to be executed. The group identification information causes the same thread to be consecutively executed by the same core and thereby, enables the core to continuously use the cache having predetermined data stored therein. Therefore, no cache-miss occurs and the use efficiency of the cache can be improved.

The execution time period of the thread may be set using the result of the analysis of the program to be executed, or can be obtained by executing the thread in advance and using the processing time period and the cache-miss rate acquired in this execution, and the expectable cache-miss rate acquired by applying the scheduler 200. Therefore, in the following description of the example, the execution time period of a thread will be referred to as "estimated processing time period".

In the example, the scheduling process executed by the scheduler 200 will be applied to each application executed by the multi-core processor system 100. However, it is assumed that an application not applied with this approach is configured by the conventional threads each having no thread information 401 appended thereto.

On the other hand, it is assumed that an application to which the scheduling process executed by the scheduler 200 is applied, is configured by plural threads, and that some of or all of the threads has any one among or both the preceding thread list and the subsequent thread list; the estimated processing time period information; and belonging-to group identification information.

A thread having any one among or both the preceding thread list and the subsequent thread list, and the estimated processing time period information will be referred to as "thread having the dependence information" and a conventional thread will be referred to as "thread having no dependence information". A thread having the group identification information will be referred to as "thread belonging to a group" and threads having the same group identification information will be referred to as "threads belonging to the same group".

When the multi-core processor system 100 is started up, the operating system usually operates to start up an application. The operating system starts up a thread that is the main thread of the application. When plural threads are present to be started up, the threads are started up beginning with the main thread. The main thread already started up further starts up another thread and, in this manner, the threads are sequentially started up. When the application has therein threads each having dependence information appended thereto, the threads are collectively started up by any one of the threads each having no dependence information appended thereto.

When a thread is newly started up, the operating system determines the allocation destination core of the thread and adds the thread to the data structure in the shared memory 300, that corresponds to the core, is referred to as "ready queue", and that stores the group of executable threads.

When the thread having the dependence information is newly started up, the scheduler 200 allocates to the same core, the threads that belong to the same group by an allocation process described below with reference to FIG. 8. In the allocation process, the threads belonging to the same group can be allocated to the same core and in addition, the allocation destinations of the threads can be determined so that the processing amounts of the cores are made as even as possible.

Figure 8:
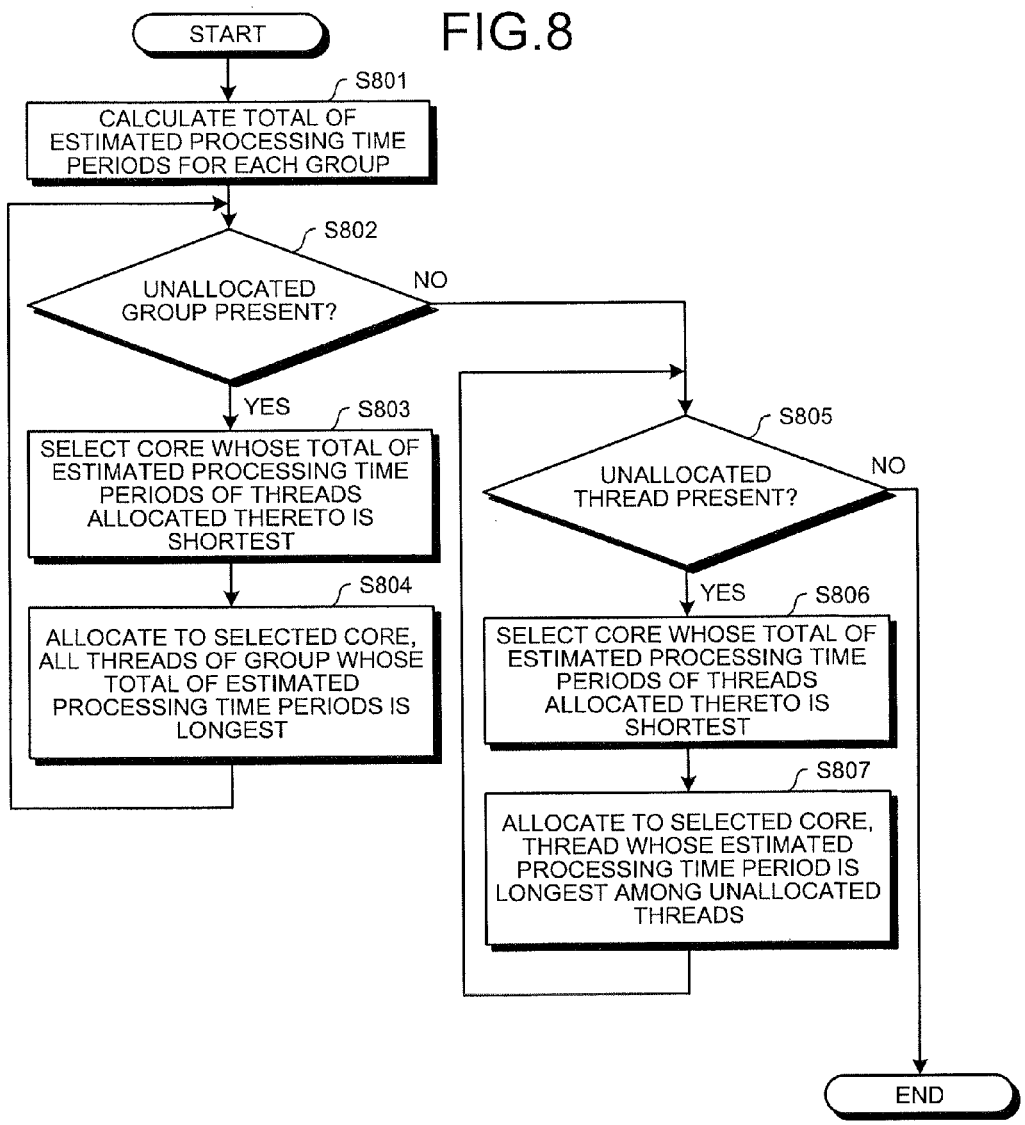
FIG. 8 is a flowchart of a procedure for an allocation process for the cores in an example.

FIG. 8 is a flowchart of a procedure for the allocation process for the cores in the example. The flowchart of FIG. 8 represents the procedure up to the operation of the scheduler 200 using the multi-core processor to allocate to the cores, the threads constituting the application. Execution of the operations of FIG. 8 enables the allocation of the threads having common group information to be executed by the same core.

In the example, the time period necessary for the execution of each group is referred to and the allocation is executed sequentially from the threads included in the group whose processing time period is long. Therefore, the allocation is enabled that enables efficient execution of the threads.

In FIG. 8, the scheduler 200 first calculates the total of the estimated processing time periods for each group (step S801) and determines whether an unallocated group is present (step S802).

If the scheduler 200 determines at step S802 that an unallocated group is present (step S802: YES), the scheduler 200 selects the core whose total of the estimated processing time periods of the threads allocated thereto is the shortest (step S803). Thereafter, the scheduler 200 allocates to the core selected at step S803, all the threads of the group whose total of the estimated processing time periods is the longest (step S804).

At steps S802 to S804, operation is executed to allocate the core to execute the actual processing to the unallocated group. If the scheduler 200 determines at step S802 that no unallocated group is present, the scheduler 200 progresses to the process to execute allocation of the threads described below to the cores.

If the scheduler 200 determines at step S802 that no unallocated group is present (step S802: NO), the scheduler 200 determines whether an unallocated thread is present (step S805). At step S805, the scheduler 200 determines for each of the threads that belong to the groups allocated to the cores, whether a thread to be executed can be allocated to the core.

If the scheduler 200 determines at step S805 that an unallocated thread is present (step S805: YES), the scheduler 200 selects from among the cores, the core whose total of the estimated processing time periods of the threads allocated thereto is shortest (step S806).

The scheduler 200 allocates to the core selected at step S806, the thread whose estimated processing time period is the longest among the unallocated threads (step S807). If the scheduler 200 determines at step S805 that an unallocated thread is present, the scheduler 200 repeats the processes executed at steps S806 and S807 and, when the scheduler 200 determines that no unallocated thread is present (step S805: NO), the scheduler 200 causes the series of allocation operations to come to an end.

After the allocation process described above, if a thread is newly added to the ready queue or if a thread is deleted from the ready queue consequent to the thread ending, the operating system causes the scheduler 200 to execute the scheduling process for the threads.

Figure 9:
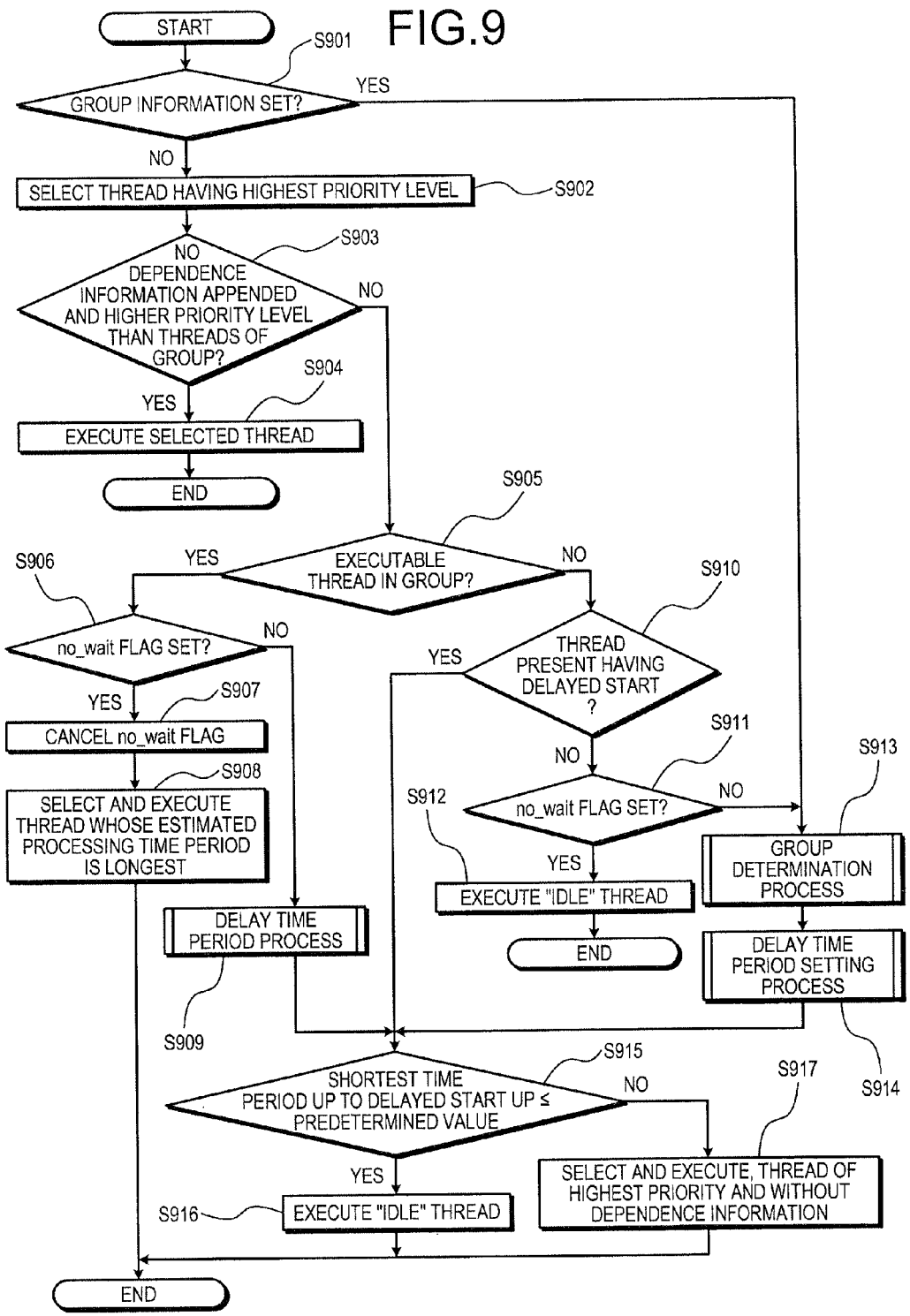
FIG. 9 is a flowchart of a procedure for the scheduling process in the example.

In conventional scheduling, the scheduler 200 executes the scheduling by referring to the priority levels of the threads. However, in the example, the scheduling process described later with reference to FIG. 9 is executed to execute the threads that belong to the same group as consecutively as possible. The scheduling process by each core is executed by the scheduler 200 respective to each ready queue.

For each core, the data configuration storing the identification information of the group that the core currently executes (execution group information) and a flag indicating whether the thread under execution has executed the time period coordination (no_wait flag) are set in the ready queue.

FIG. 9 is a flowchart of a procedure for the scheduling process in the example. The flowchart of FIG. 9 represents the procedure executed by the scheduler 200 for setting the execution timings of the threads allocated to each core. Execution of the processes of FIG. 9 enables reduction of the occurrences of the standby time period between threads.

In FIG. 9, the scheduler 200 first determines whether any group information is set in each of the threads under execution by the cores (step S901). If the scheduler 200 determines at step S901 that no group information is set (step S901: NO), the scheduler 200 selects from the ready queue, the thread having the highest priority level (step S902). The scheduler 200 determines whether the thread selected at step S902 has no dependence information appended and has a higher priority level than that of the thread belonging to the group (step S903).

If the scheduler 200 determines at step S903 that the selected thread has no dependence information appended and has a higher priority level than that of the thread belonging to the group (step S903: YES), the scheduler 200 causes the selected thread to be executed (step S904) and causes the scheduling to come to an end. On the other hand, if the scheduler 200 determines at step S903 that the selected thread has the dependence information appended or does not have a higher priority level (step S903: NO), the scheduler 200 determines whether an executable thread is present in the group (step S905).

If the scheduler 200 determines at step S905 that an executable thread is present in the group (step S905: YES), the scheduler 200 determines whether the no_wait flag is set in the executable thread (step S906).

If the scheduler 200 determines at step S906 that the no_wait flag is set (step S906: YES), the scheduler 200 cancels the no_wait flag (step S907). The scheduler 200 selects the thread whose estimated processing time period is the longest among the executable threads in the group and causes the selected thread to be executed (step S908), and causes the scheduling to come to an end.

If the scheduler 200 determines at step S906 that no no_wait flag is set (step S906: NO), the scheduler 200 executes a delay time period process (step S909), makes a setting for delayed start up and thereafter, progresses to the process at step S915.

On the other hand, if the scheduler 200 determines at step S905 that no executable thread is present in the group (step S905: NO), the scheduler 200 determines whether a thread is present that has the delayed start up set therein (step S910). If the scheduler 200 determines at step S910 that a thread is present that has the delayed start up set therein (step S910: YES), the scheduler 200 progresses to the process at step S915.

On the other hand, if the scheduler 200 determines at step S910 that no thread is present that has the delayed start up set therein (step S910: NO), the scheduler 200 further determines whether a no_wait flag is set in the thread (step S911). If the scheduler 200 determines at step S911 that the no_wait flag is set (step S911: YES), the scheduler 200 causes an "Idle" thread to be executed (step S912) and causes the series of operations to come to an end.

If the scheduler 200 determines at step S911 that no no_wait flag is set (step S911: NO), the scheduler 200 executes a group determination process (step S913) and a delay time period setting process (step S914), and progresses to the process at step S915.

When the delay time period setting process is executed or when the scheduler 200 determines at step S910 that a thread is present that has the delayed start up set therein, the scheduler 200 determines if the shortest time period up to the delayed start up is equal to or shorter than the predetermined value (step S915). The scheduler 200 determines at step S915 whether any thread constituting another application is executed during the standby time period up to the delayed start up.

If the scheduler 200 determines at step S915 that the shortest time period is equal to or shorter than the predetermined value (step S915: YES), the scheduler 200 causes the "Idle" thread to be executed (step S916) and causes the series of operations to come to an end. On the other hand, if the scheduler 200 determines at step S915 that the shortest time period is not equal to or shorter than the predetermined value (step S915: NO), the scheduler 200 selects from the ready queue, the thread whose priority level is the highest and that has no dependence information appended thereto, and causes the selected thread to be executed (step S917), and causes the series of operations to come to an end.

Detailed procedures for such processes will be described as the group determination process at step S913 and the delay time period setting process at steps S909 and S914.

Figure 10:
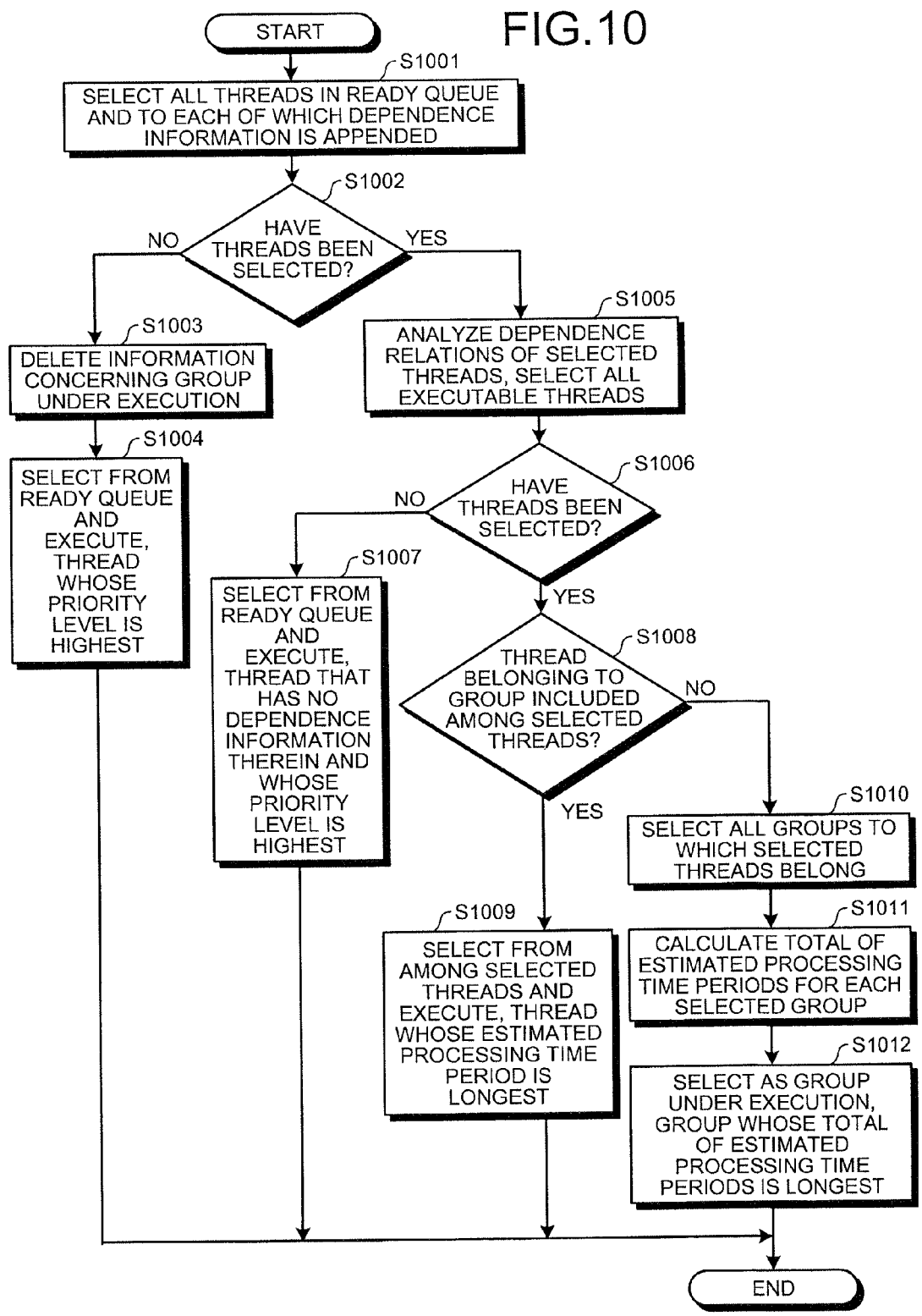
FIG. 10 is a flowchart of the procedure for a group determination process in the example.

FIG. 10 is a flowchart of the procedure for the group determination process in the example. The flowchart of FIG. 10 represents processing details at step S913 of the scheduling process described with reference to FIG. 9. Execution of the operations of FIG. 10 enables determination of the group of the processes whose groups are not determined.

In FIG. 10, the scheduler 200 first selects all the threads in the ready queue and to each of which the dependence information is appended (step S1001) and determines whether threads have been selected at step S1001 (step S1002).

If the scheduler 200 determines at step S1002 that no thread has been selected (step S1002: NO), the scheduler 200 deletes the information concerning the group under execution by the core (step S1003), selects from the ready queue, the thread whose priority level is the highest, causes the selected thread to be executed (step S1004), and causes the series of operations to come to an end.

On the other hand, if the scheduler 200 determines at step S1002 that threads have been selected (step S1002: YES), the scheduler 200 analyzes the dependence relations of the selected threads, selects all the executable threads therefrom (step S1005), and determines whether threads have been selected at step S1005 (step S1006).

If the scheduler 200 determines at step S1006 that no thread has been selected (step S1006: NO), the scheduler 200 selects from the ready queue, the thread that has no dependence information therein and whose priority level is the highest, causes the selected thread to be executed (step S1007), and causes the series of operations to come to an end.

On the other hand, if the scheduler 200 determines at step S1006 that some threads have been selected (step S1006: YES), the scheduler 200 further determines whether a thread belonging to the group is included among the selected threads (step S1008).

If the scheduler 200 determines at step S1008 that a thread belonging to the group is included (step S1008: YES), the scheduler 200 selects from the threads selected at step S1005, the thread whose estimated processing time period is the longest, causes the selected thread to be executed (step S1009), and causes the series of operations to come to an end.

If the scheduler 200 determines at step S1008 that no thread belonging to the group is included (step S1008: NO), the scheduler 200 selects all the groups to which the threads selected at step S1005 belong (step S1010), calculates the total of the estimated processing time periods for each group selected at step S1010 (step S1011), selects as the group under execution, the group whose total of the estimated processing time periods calculated at step S1011 is the longest (step S1012), and causes the series of operations to come to an end.

Figure 11:
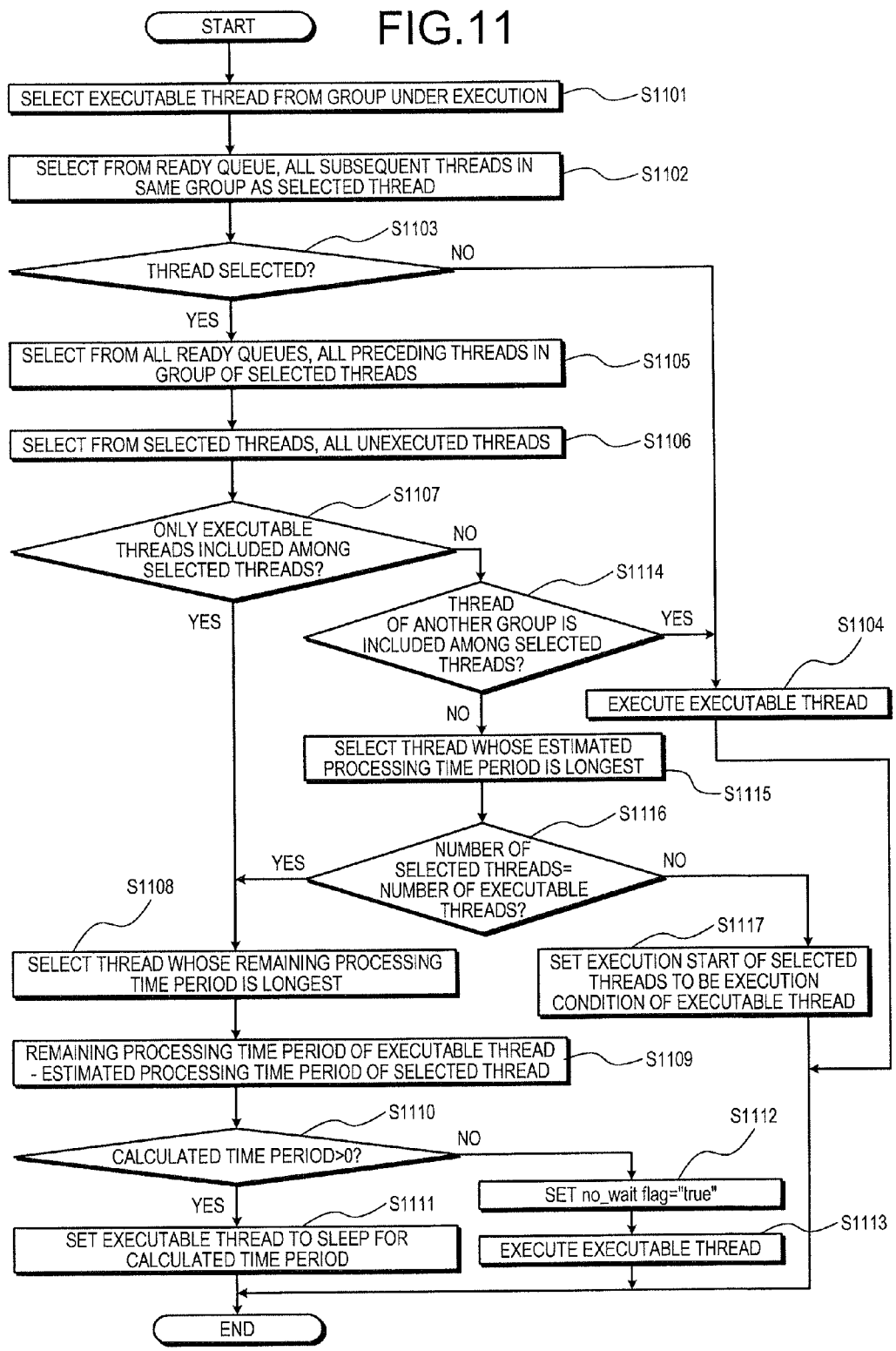
FIG. 11 is a flowchart of the procedure for a delay time period setting process in the example.

FIG. 11 is a flowchart of the procedure for the delay time period setting process in the example. The flowchart of FIG. 11 represents the detailed procedure for the delay time period setting process at steps S909 and S914 of FIG. 9. Execution of the processes of FIG. 11 enables the setting, for the thread not executable immediately after the preceding thread thereof, of a proper delay time period to coordinate the execution starting time such that the subsequent threads thereof become executable immediately after the thread comes to an end.

In FIG. 11, the scheduler 200 selects an executable thread from the group to which the process under execution by the core belongs (step S1101) and, thereafter, selects all the subsequent threads in the same group of the thread selected at step S1101 from the ready queue to be executed (step S1102).

The scheduler 200 determines whether a thread satisfying the condition at step S1102 has been selected (step S1103). If the scheduler 200 determines at step S1103 that no thread has been selected (step S1103: NO), the scheduler 200 does not need to set any delay time period. Therefore, the scheduler 200 causes the executable thread selected at step S1101 to be executed (step S1104) and causes the series of operations to come to an end.

On the other hand, if the scheduler 200 determines at step S1103 that a thread has been selected (step S1103: YES), the scheduler 200 selects all the preceding threads in the group of threads selected at step S1102 from all the ready queues (step S1105) and further selects all the unexecuted threads from the threads selected at step S1105 (step S1106).

Thereafter, the scheduler 200 determines whether only the executable threads are included among the selected threads (step S1107). If the scheduler 200 determines at step S1107 that only the executable threads are included (step S1107: YES), the scheduler 200 selects the thread whose remaining processing time period is the longest among the threads selected at step S1105 (step S1108).

The scheduler 200 calculates the time period acquired by subtracting the estimated processing time period of the executable thread selected at step S1101 from the processing time period of the thread selected at step S1108 (step S1109) and determines whether the time period calculated at step S1109 is greater than zero (step S1110).

If the scheduler 200 determines at step S1110 that the calculated time period is greater than zero (step S1110: YES), the scheduler 200 progresses to a standby time period setting process. The scheduler 200 sets the executable thread selected at step S1101 to sleep for the time period calculated at step S1109 (step S1111) and causes the series of operations to come to an end.

On the other hand, if the scheduler 200 determines at step S1110 that the calculated time period is not longer than zero (step S1110: NO), the scheduler 200 does not need to set the standby time period and therefore, sets the no_wait flag to be "true" (step S1112). Thereafter, the scheduler 200 causes the executable thread selected at step S1101 to be executed (step S1113), and causes the series of operations to come to an end.

If the scheduler 200 determines at step S1107 that not only the executable threads are included (step S1107: NO), the scheduler 200 progresses to the threads of another group as the threads to be executed. Therefore, the scheduler 200 determines whether a thread of another group allocated to the core is included among the threads selected at step S1106 (step S1114).

If the scheduler 200 determines that a thread of another group is included (step S1114: YES), the scheduler 200 causes the executable thread selected at step S1101 to be executed (step S1104) and causes the series of operations to come to an end.

On the other hand, if the scheduler 200 determines that no thread of another group is included (step S1114: NO), the scheduler 200 selects the thread whose estimated processing time period is the longest from the threads selected at step S1106 (step S1115) and thereafter, determines whether the number of threads selected at step S1115 is equal to the number of executable threads selected at step S1101 (step S1116).

If the scheduler 200 determines at step S1116 that the number of threads is equal to the number of executable threads (step S1116: YES), the scheduler 200 progresses to the process at step S1108. On the other hand, if the scheduler 200 determines at step S1116 that the number of threads is not equal to the number of executable threads (step S1116: NO), the scheduler 200 sets the execution start of the threads selected at step S1115 to be a condition enabling execution of the executable thread selected at step S1101 (step S1117) and causes the series of operations to come to an end.

In the example, execution of the scheduling process enables efficient execution of the application by the multi-core processor system 100. Examples of operations executed when the multi-core processor system 100 described in the example executes the various applications will be described.

In first execution example, the execution content will be described that is executed when a group of 10 threads each having the dependence information (a group 1 of the threads described later) is started up, as an example of typical application. The multi-core processor system 100 executing the first execution example includes four cores of the cores #0 to #3. The group 1 of the threads to be executed by the multi-core processor system 100 is divided into four groups including groups 1 to 4. Therefore, the scheduler 200 can allocate to each of the cores, threads each of group different from that the others.

Figure 12:
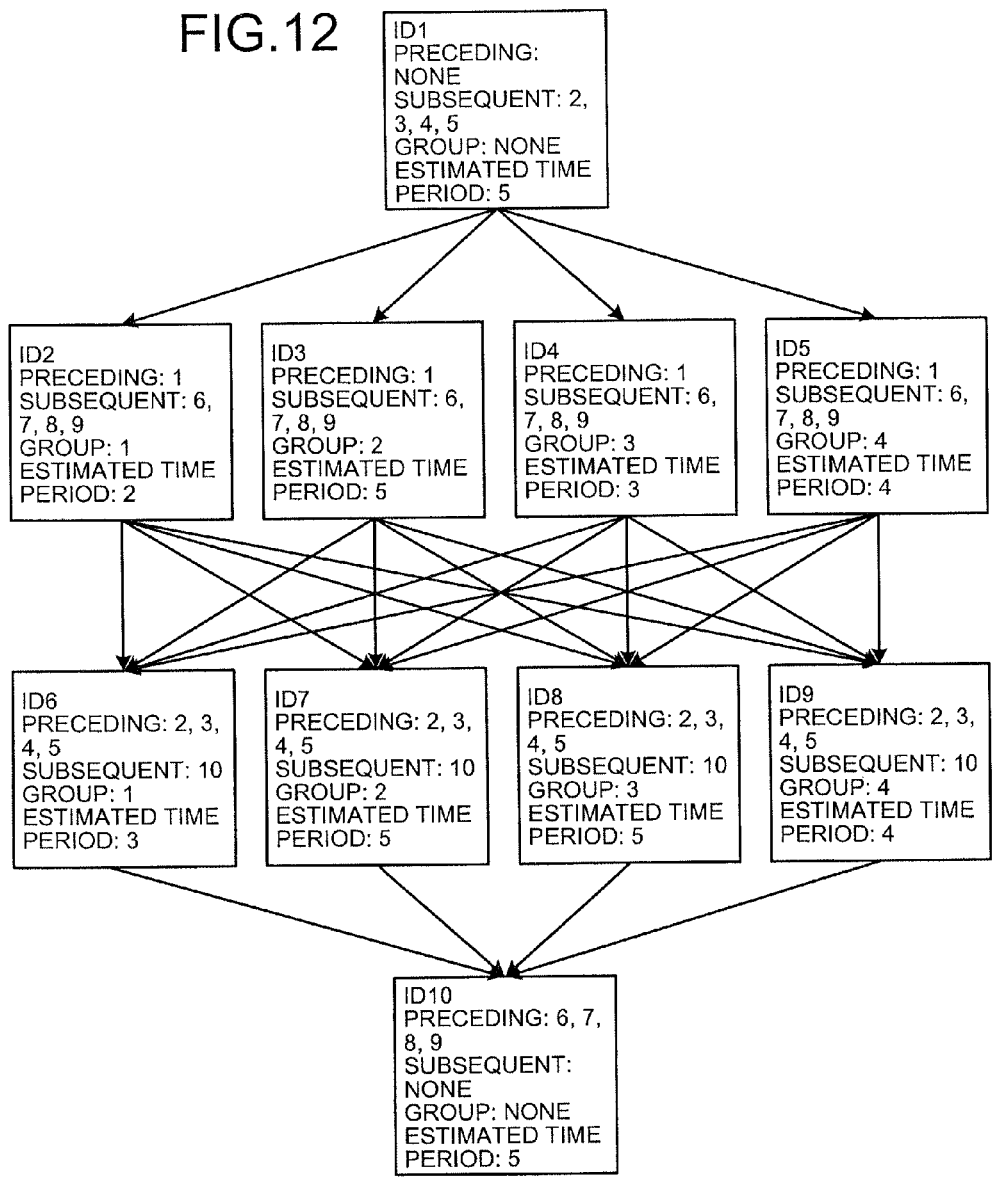
FIG. 12 is an explanatory diagram of a configuration of a group 1 of threads.

FIG. 12 is an explanatory diagram of the configuration of the group 1 of the threads. As depicted in FIG. 12, the group 1 of the threads includes 10 threads of ID1 to ID10. Each of the threads is appended with information such as the dependence information in addition to the ID to identify the thread.

Figure 13:
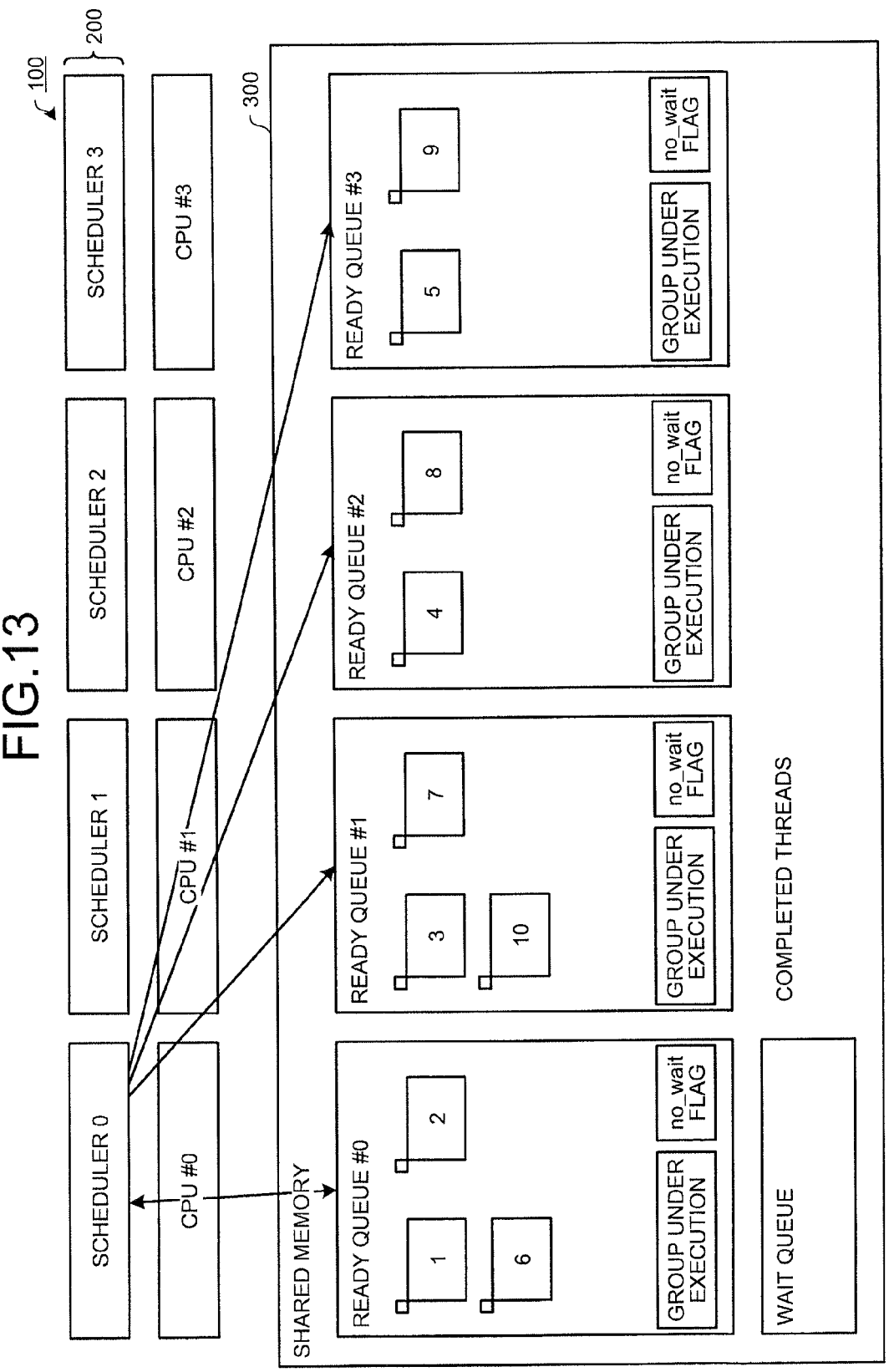
FIG. 13 is a diagram of an example of queue allocation for the group 1 of the threads.

Preceding: Information that indicates the ID of a preceding thread having a dependence relation
Subsequent: Information that indicates the ID of a subsequent thread having a dependence relation
Group: Information that indicates groups whose data to be used to execute a thread are common
Estimated Time Period: Information that indicates the time period estimated as the time period necessary for executing a thread FIG. 13 is a diagram of an example of queue allocation for the group 1 of the threads. When the allocation process described with reference to FIG. 8 is executed, the group 1 of the threads is distributed among the ready queues of the cores as depicted in FIG. 13. For example, the threads ID1, ID2, and ID6 are allocated to the core #0; the threads ID3, ID7, and ID10 are allocated to the core #1; the threads ID4 and ID8 are allocated to the core #2; and the threads ID5 and ID9 are allocated to the core #3.

Figure 14:
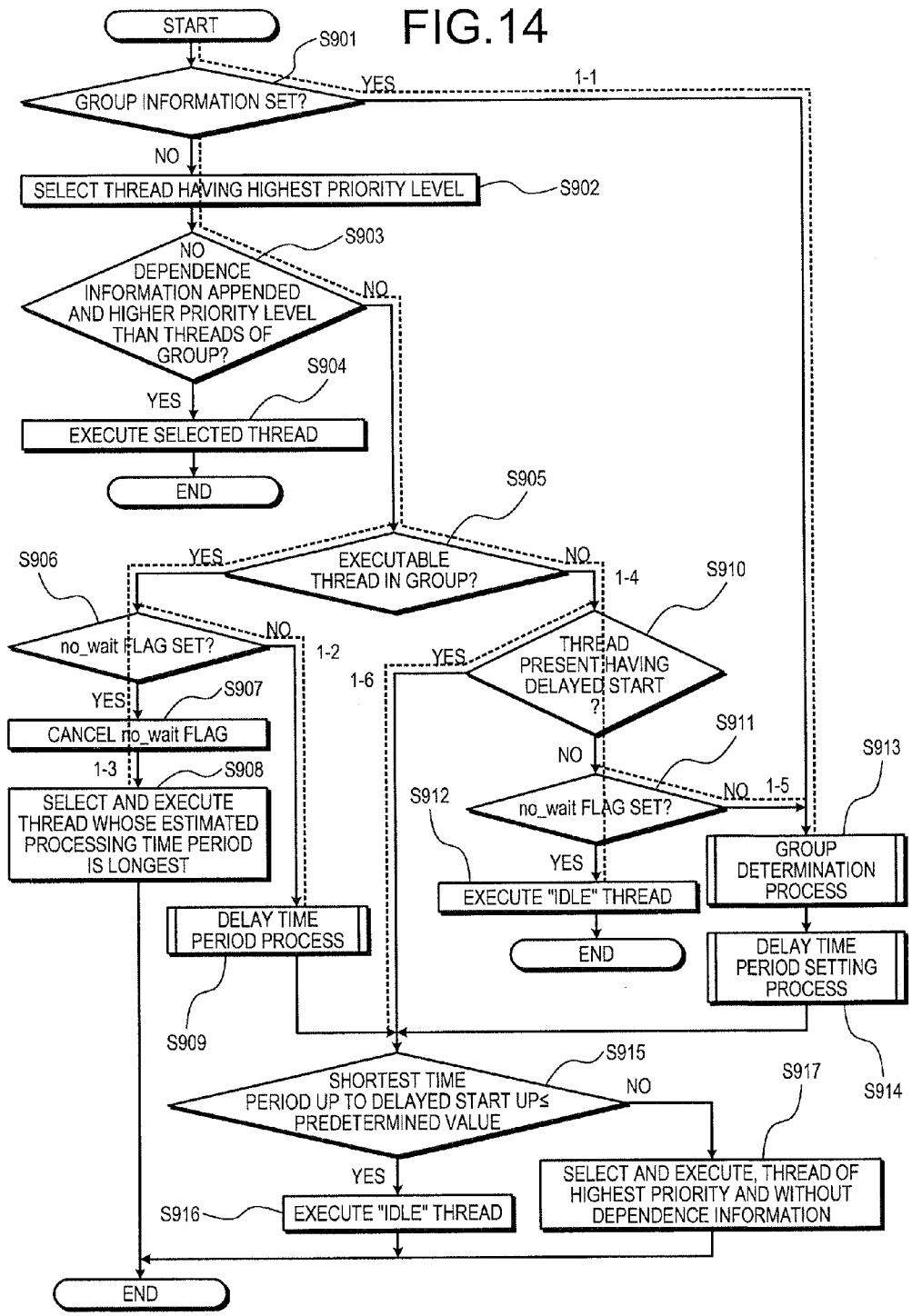
FIG. 14 is a diagram of an example of routes of the scheduling process.
Figure 15:
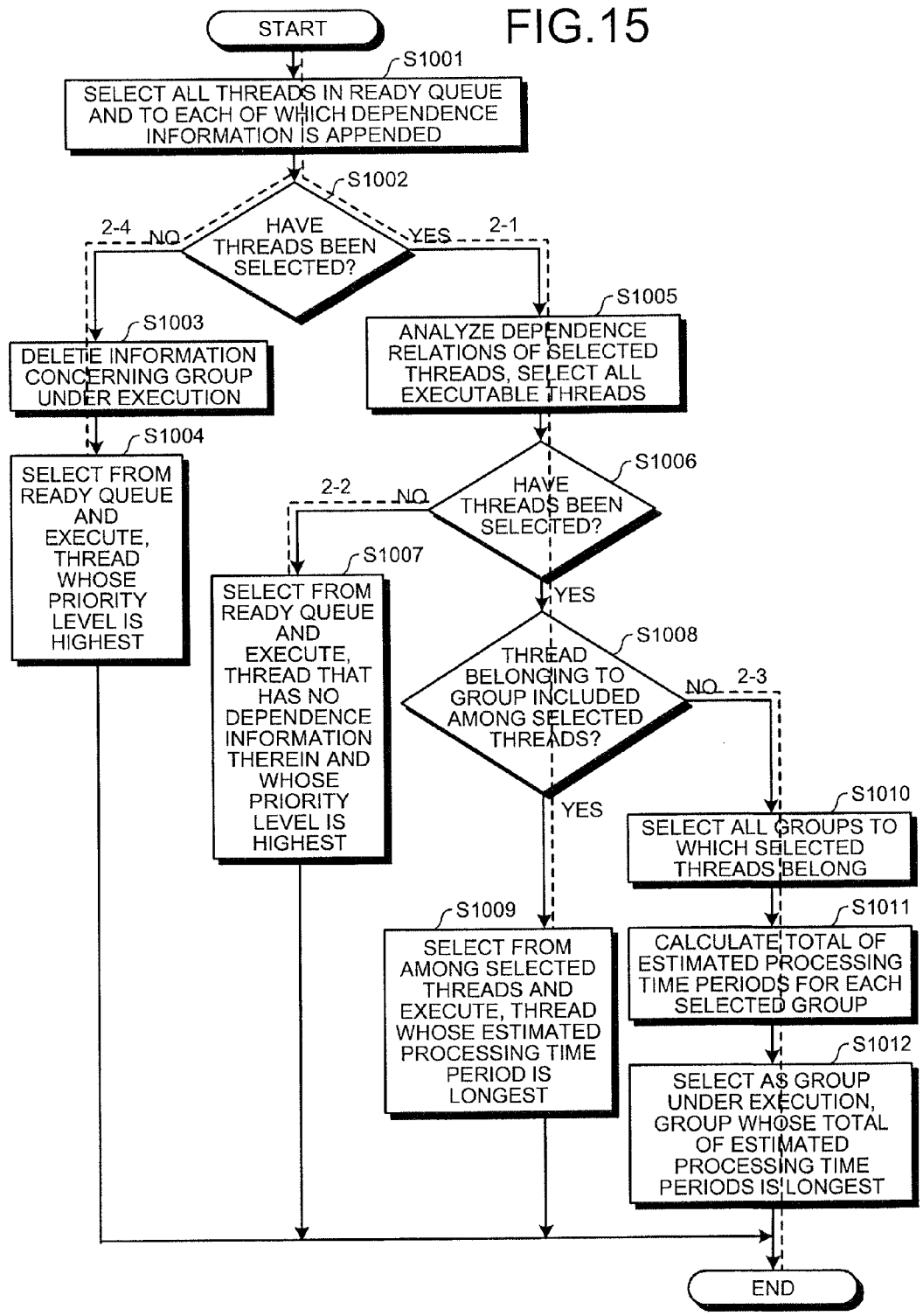
FIG. 15 is a diagram of an example of routes of the group determination process.
Figure 16:
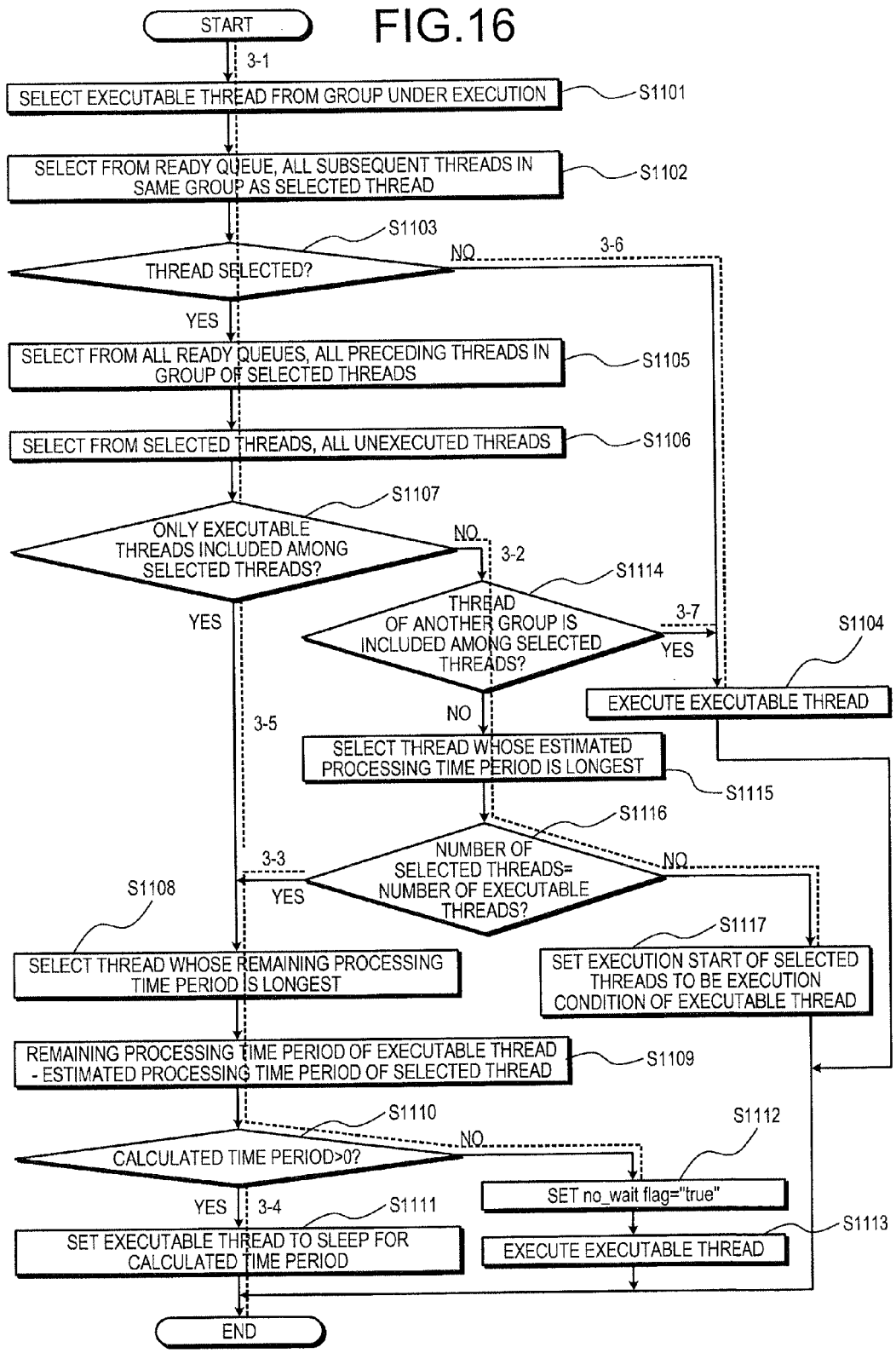
FIG. 16 is a diagram of an example of routes of the delay time period setting process.

FIG. 14 is a diagram of an example of routes of the scheduling process. FIG. 15 is a diagram of an example of routes of the group determination process. FIG. 16 is a diagram of an example of routes of the delay time period setting process. In the following description of the exemplary execution, details will be described taking an example of the routes representing an execution procedure of each of the processes depicted in FIGS. 14 to 16.

When the threads of the group 1 of the threads are allocated to the cores, the scheduler 200 sets the execution timing of each of the threads by referring to the dependence information thereof. For the group 1 of the threads, the core #0 follows a route 1-1 depicted in FIG. 14 and a route 2-1 depicted in FIG. 15 and thereby, executes the thread ID1 that has no preceding thread.

During the execution of the thread ID1, the cores #1 to #3 have no executable thread included among the threads having dependence relations and therefore, the scheduler 200 follows the route 1-1 of FIG. 14 and a route 2-2 of FIG. 15. Therefore, the cores #1 to #3 execute the threads of another application software in the ready queues.

After the execution of the thread ID1 by the core #0 comes to an end, the conventional scheduler executes the scheduling using only the core #0. However, in the exemplary execution, the scheduler 200 searches the ready queue that retains the subsequent thread when the thread to which the dependence information is appended ends. The scheduler 200 issues from the core #0 to the other cores (the cores #1 to #3), a scheduling request to cause the core correlated with the ready queue to also execute the scheduling.

In response to the end of the thread ID1, the thread ID2 becomes executable by the core #0. However, when the thread ID1 ends, no group under execution has been yet set. Therefore, the scheduler 200 follows the route 1-1 of FIG. 14 and a route 2-3 of FIG. 15 and, using the core #0, determines the group 1 as the group under execution.

For the core #0, the thread ID6 that is the subsequent thread of the thread ID2 and that belongs to the same group as that for the thread ID2 is allocated to the same core. Therefore, the scheduler 200 follows a route 3-1 of FIG. 16. Consequently, the execution time period of the thread that is among the preceding threads of the thread ID6 and whose execution has not yet started, is compared.

When the group 1 of the threads is executed, in response to the completion of the thread ID1, the cores execute substantially simultaneously the scheduling for the threads ID2 to ID5 that are subsequent threads of the thread ID1. Therefore, assuming that, at the moment of the execution of the route 3-1, execution of none of the threads ID2 to ID5 that become executable consequent to the completion of the thread ID1 is started, the thread that is unexecuted and whose processing time period is the longest is the thread ID3. The scheduler 200 follows a route 3-2 of FIG. 16 and sets the start of the execution of the thread ID3 to be the condition for the thread ID2 to be executable.

The scheduler 200 of the core #1 follows the route 1-1 of FIG. 14, the route 2-3 of FIG. 15, and the route 3-1 of FIG. 16. The executable thread ID3 has an estimated processing time period that is the longest among the preceding threads of the subsequent thread ID7 that belongs to the same group. The scheduler 200 follows a route 3-3 of FIG. 16 and executes the scheduling for the thread ID3 to be executed.

Before the start of the thread ID3, the scheduler 200 of the core #3, similar to the core #0, sets the start of the execution of the thread ID3 to be a condition for the thread ID5 to be executable. On the other hand, after the start of the thread ID3, the scheduler 200 of the core #3 follows a route 3-4 of FIG. 16 and sets the delayed start up.

When the scheduler 200 sets the delayed start up period, the cores can coordinate the delayed start up of the thread using a conventional scheduling technique. For example, the delayed start up can be implemented by using a function such as "usleep" provided by an existing operating system. Therefore, an exemplary approach of implementing the delayed start up will not be described. However, the thread for which the delayed start up is set, is removed from the ready queue as a sleeping thread and is put back into the ready queue after the delay time period elapses.

The scheduler 200 of the core #2 executes different operations depending on the timing to execute the scheduling process. For example, in a case where the scheduler 200 executes the scheduling process, if the thread ID3 is unexecuted, the scheduler 200 follows the route 3-2 of FIG. 16 and sets the start of the execution of the thread ID3 to be a condition for the thread ID4 to be executable. In a case where the scheduler 200 executes the scheduling process, if the thread ID3 is under execution and the thread ID5 is unexecuted, the scheduler 200 sets the start of the execution of the thread ID5 to be a condition for the thread ID4 to be executable even after similarly following the route 3-2 of FIG. 16.

When the thread ID5 is sleeping during the execution of the scheduling process by the scheduler 200, if no sleeping thread is present in the ready queue, the estimated processing time period of the thread ID4 is the longest among the unexecuted threads in the ready queue and therefore, the scheduler 200 follows the routes 3-3 and 3-4 of FIG. 16 and sets the delay time period. The thread ID4 is caused to sleep for the delay time period.

Thereafter, when the execution of the thread ID3 is started, the threads again become executable for which the start of the thread ID3 is set to be the condition for them to be executable. Therefore, because the group is already determined this time, the scheduler 200 follows a route 1-2 of FIG. 14 and executes the delay time period setting process. In the delay time period setting process, the schedule 200 follows the routes 3-1 to 3-4 of FIG. 16 and, when the unexecuted threads have decreased, follows a route 3-5 of FIG. 16 and executes any one operation of: executing the thread to be executed; causing the thread to be executed to sleep; and again setting the start of execution of another thread to be a condition for the thread to be executed to become executable and standing by.

When the execution of the thread ID2 by the core #0 comes to an end, the scheduler 200 again executes the scheduling. At this time, the no_wait flag of the thread to be executed indicates "true" and therefore, if any executable thread is included in the same group, the scheduler 200 follows a route 1-3 of FIG. 14 and causes the thread to be executed immediately. Even when the no_wait flag does not indicate "true", if another preceding thread comes to an end soon, the scheduler 200 follows a route 1-4, causes the "Idle" thread to be executed so as to not degrade the cache, and waits for the preceding thread to come to an end. The above processes are executed similarly by the schedulers 200 of the cores #1 to #3.

When the scheduling processes of the threads ID6 to ID9 come to an end, the scheduler 200 finally starts the scheduling process for the thread ID10 as the thread to be executed. The thread ID10 does not belong to any group and therefore, when all the preceding threads come to an end, the scheduler 200 determines at the ending timing that any unexecuted thread is no longer included in the group. The scheduler 200 follows a route 1-5 of FIG. 14 and the route 2-1 of FIG. 15 and causes the thread ID10 to be executed.

Thereafter, when the thread ID10 comes to an end, the scheduler 200 of the core #1 to which the thread ID10 is allocated follows the route 1-5 of FIG. 14 and a route 2-4 of FIG. 15, and deletes the group information of the group under execution because no other thread is present having the dependence information. Similarly, when the threads ID6, ID8, and ID9 come to an end, the scheduler 200 of another core follows the route 1-5 of FIG. 14 and the route 2-4 of FIG. 15 and deletes the group information of the group under execution.

When the thread to be executed is sleeping, the scheduler 200 causes the thread having no dependence information to be executed. In a case where the thread to be executed continues to sleep even when the thread under execution comes to an end, the scheduler 200 tries executing another thread by following a route 1-6 of FIG. 14. When, during execution of application software to which dependence information is appended, a thread whose priority level is high is executed by an interrupt, another application software, etc., the scheduler 200 follows a route 1-7 of FIG. 14 and executes the scheduling.

Figure 17:
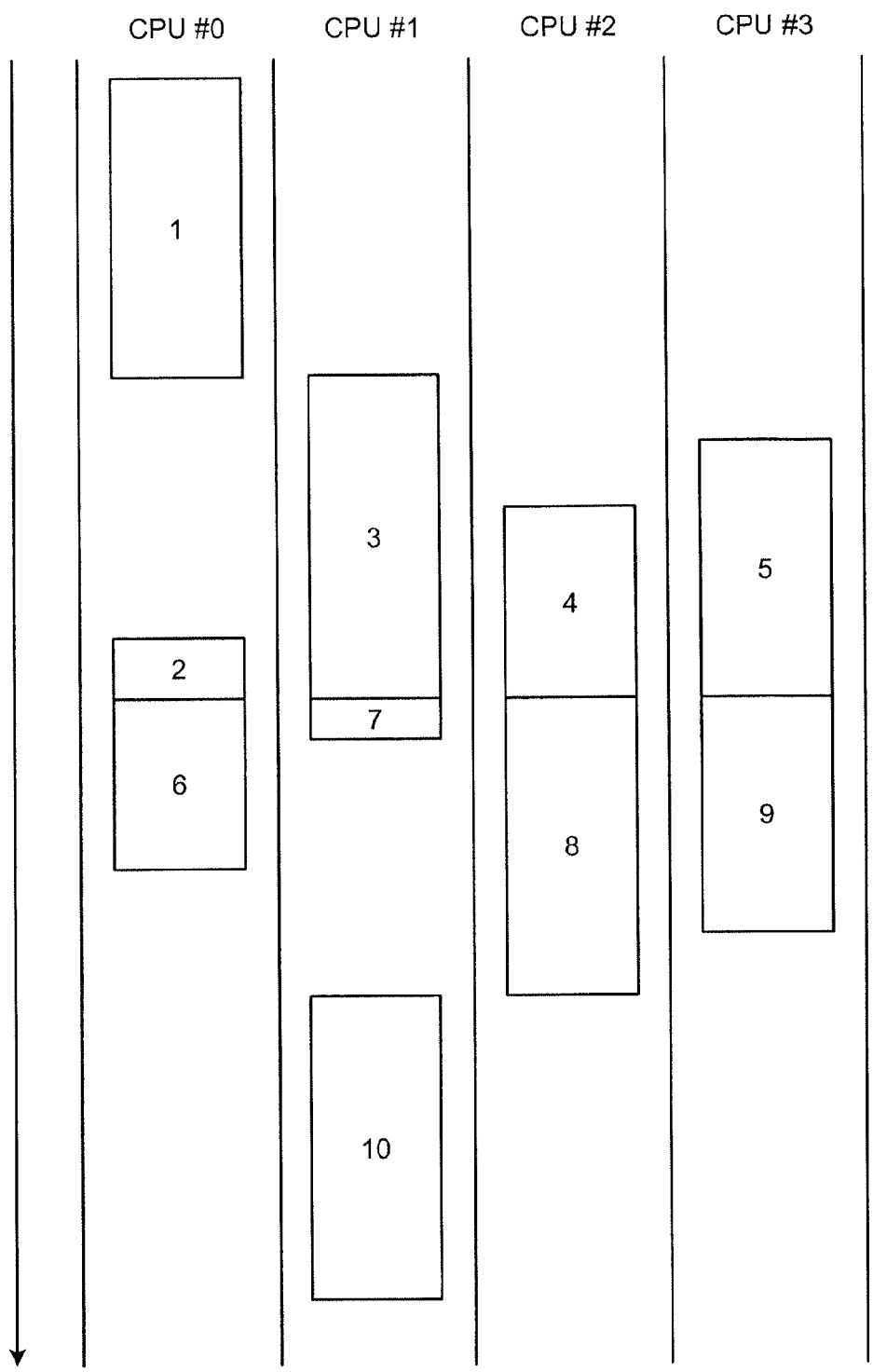
FIG. 17 is an explanatory diagram of an execution result of the group 1 of the threads (by four cores)

FIG. 17 is an explanatory diagram of an execution result of the group 1 of the threads (by the four cores). As in the first execution example, when the multi-core processor system 100 including the four cores executes the group 1 of the threads, the scheduling is executed for the order depicted in FIG. 17.

At the time when the thread ID10 that is the subsequent thread of the thread ID8 becomes executable, the threads ID6 to ID9 that are the preceding processes thereof come to an end. Therefore, the thread ID10 is executed immediately after the thread ID8, which is the preceding process executed by the same core, comes to an end.

Concerning the threads ID2 to ID5 that are the subsequent threads of the thread ID1, the execution starting times of the threads ID2, ID4, and ID5 are scheduled relative to the execution ending time of the thread ID3 whose estimated processing time period is the longest. As a result, the threads ID2 to ID5 come to an end at the same time and therefore, the scheduler 200 schedules the threads ID6 to ID9, which are the subsequent threads of the threads ID2 to ID5, to consecutively be executed without sandwiching any standby time period between the end of the threads ID2 to ID5 and the start of the threads ID6 to ID9.

In a second execution example, exemplary execution will be described for the group 2 (of the threads) (see FIG. 18) having a more complicated configuration than that of the group 1 of the threads executed in the first execution example. Similarly to the first execution example, the second execution example employs the multi-core processor system 100 that also includes the four cores of the cores #0 to #3. However, the group 2 of the threads to be executed is a group of 18 threads, each having the dependence information.

Figure 18:
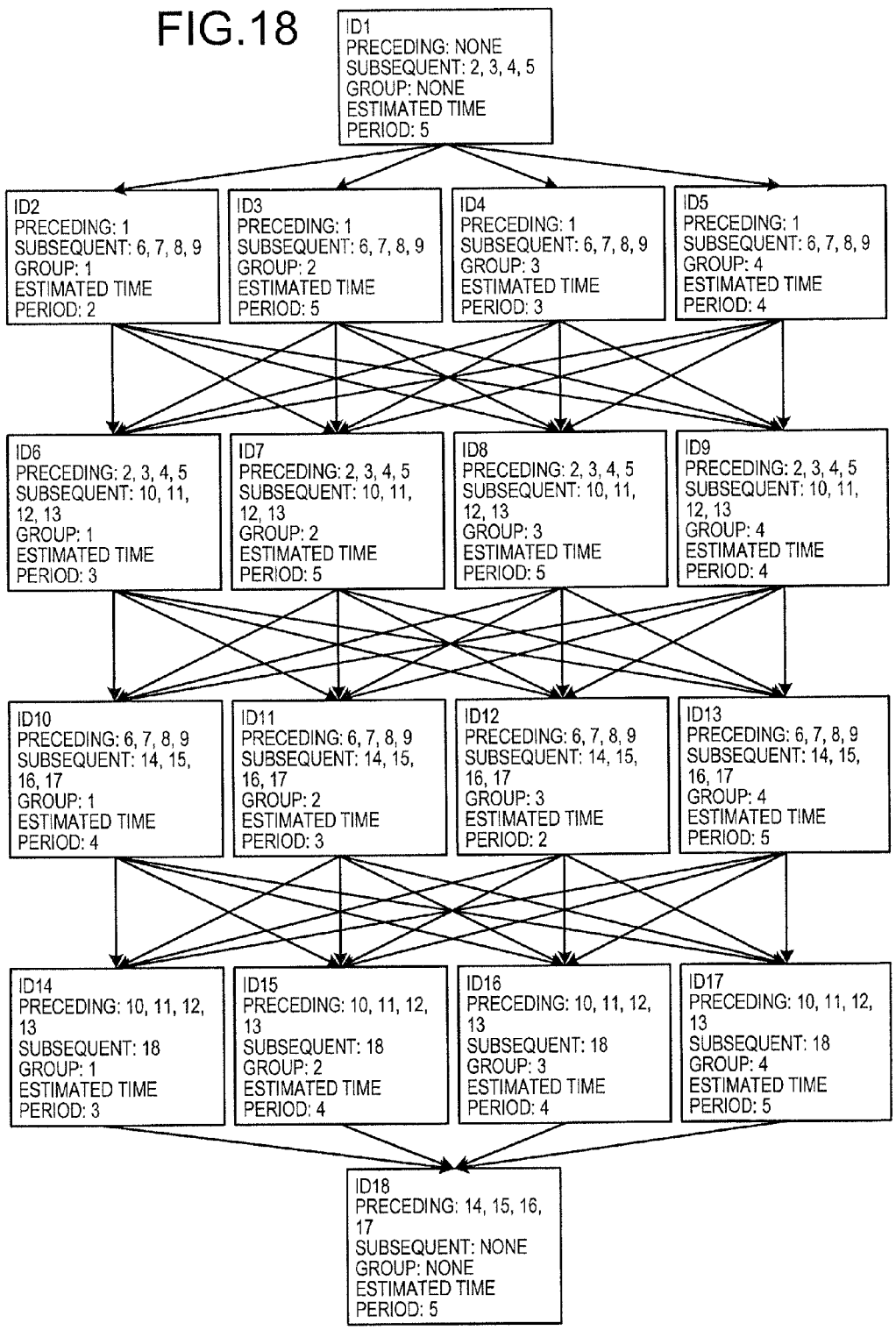
FIG. 18 is an explanatory diagram of a configuration of a group 2 of the threads.

FIG. 18 is an explanatory diagram of the configuration of a group 2 of the threads. As depicted in FIG. 18, the group 2 of the threads includes 18 threads ID1 to ID18. Similarly to the threads of the group 1 of the threads, the dependence information is appended to each of the threads in addition to the ID to identify the thread.

Figure 19:
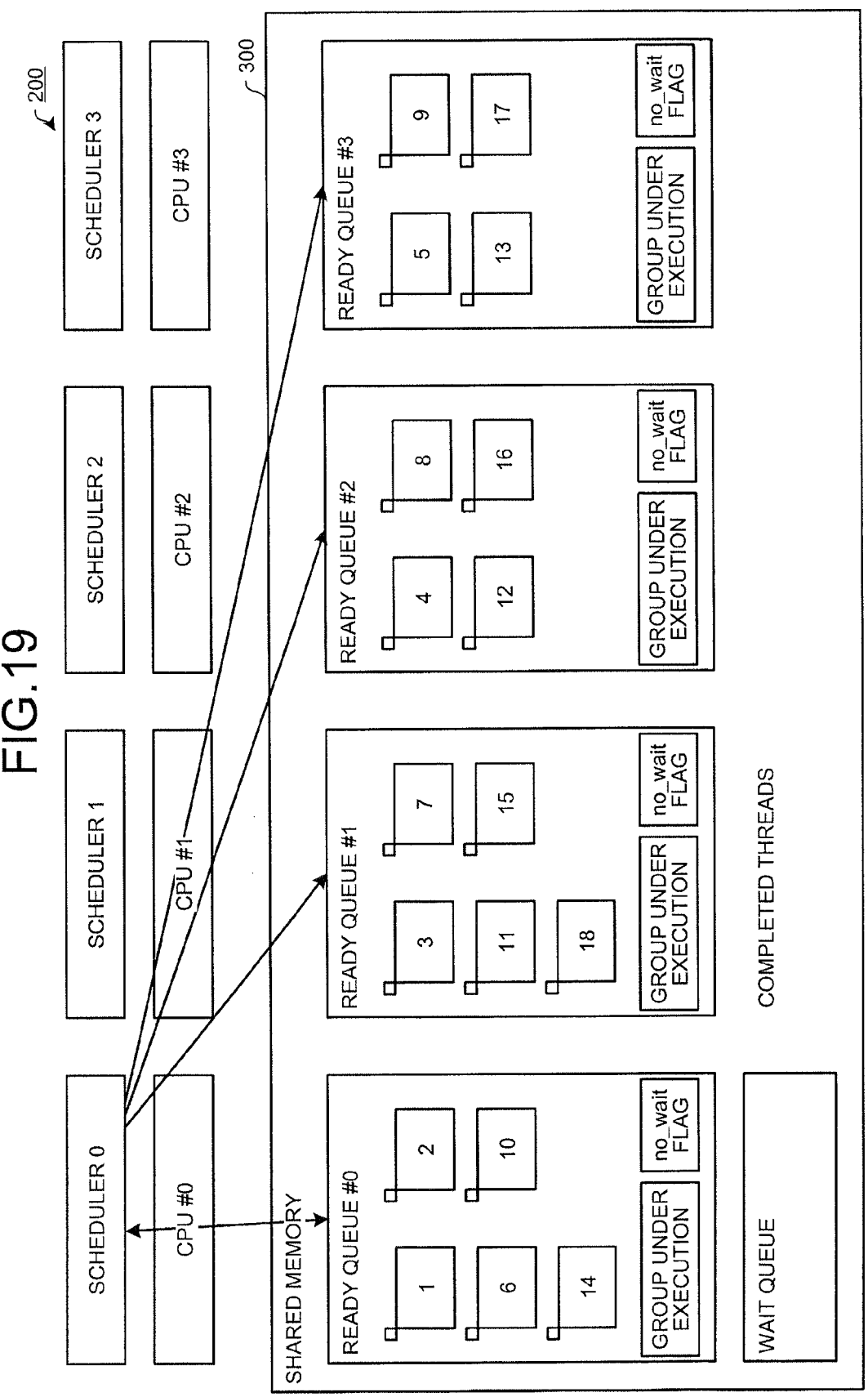
FIG. 19 is a diagram of an example of queue allocation for the group 2 of the threads.

FIG. 19 is a diagram of an example of queue allocation for the group 2 of the threads. When the allocation process described with reference to FIG. 8 is executed, the group 2 of the threads is distributed among the ready queues of the cores as depicted in FIG. 19. For example, the threads ID1, ID2, ID6, ID10, and ID14 are allocated to the core #0; the threads ID3, ID7, ID11, ID15, and ID 18 are allocated to the core #1; the threads ID4, ID8, ID12, and ID16 are allocated to the core #2; and the threads ID5, ID9, ID13, and ID17 are allocated to the core #3.

Execution details will be described for the second execution example also taking the routes representing the procedures for execution of the processes depicted in FIGS. 14 to 16. In the case of the second execution example, the threads ID1 to ID9 are also scheduled following the procedure identical to that for the first execution example. Therefore, the scheduling of the thread ID10 and those subsequent will be described.

The threads ID10 to ID13 become executable at the timing at which the thread ID8, whose estimated processing time period is the longest among the preceding threads, comes to an end. At this time, for the threads ID10, ID11, and ID13, the scheduler 200 follows the same procedure as that for the threads ID2 to ID5 and sets the execution timings therefor. On the other hand, the thread ID12 becomes executable in response to the end of the process of the same group executed immediately therebefore by the same core. Therefore, the scheduler 200 can cause the thread ID12 to be executed immediately without any time coordination by following the route 1-7 of FIG. 14.

As a result of the scheduling, the scheduler 200 causes the threads ID14, ID15, and ID17 to be executed immediately because the no_wait flags are set for these threads. No no_wait flag is set for the thread ID16 and therefore, the thread ID16 originally is included among the threads for the time coordination. However, when the group 2 of the threads is caused to be executed, no thread belonging to the same group is included among the subsequent threads. Therefore, the scheduler 200 follows the route 1-5 of FIG. 14, the route 2-3 of FIG. 15, and a route 3-6 of FIG. 16, and executes scheduling to cause the thread ID16 to be executed immediately.

Assuming that a thread belonging to the same group is prepared as the subsequent thread of the thread ID16, the scheduler 200 coordinates the execution starting time of the thread ID16 so that the thread ID16 ends at the same time as the ending time of the thread ID17 whose processing time period is long. In this case, the no_wait flag is set only for the subsequent thread of the thread ID16 and therefore, the thread ID16 is immediately executed.

Figure 20:
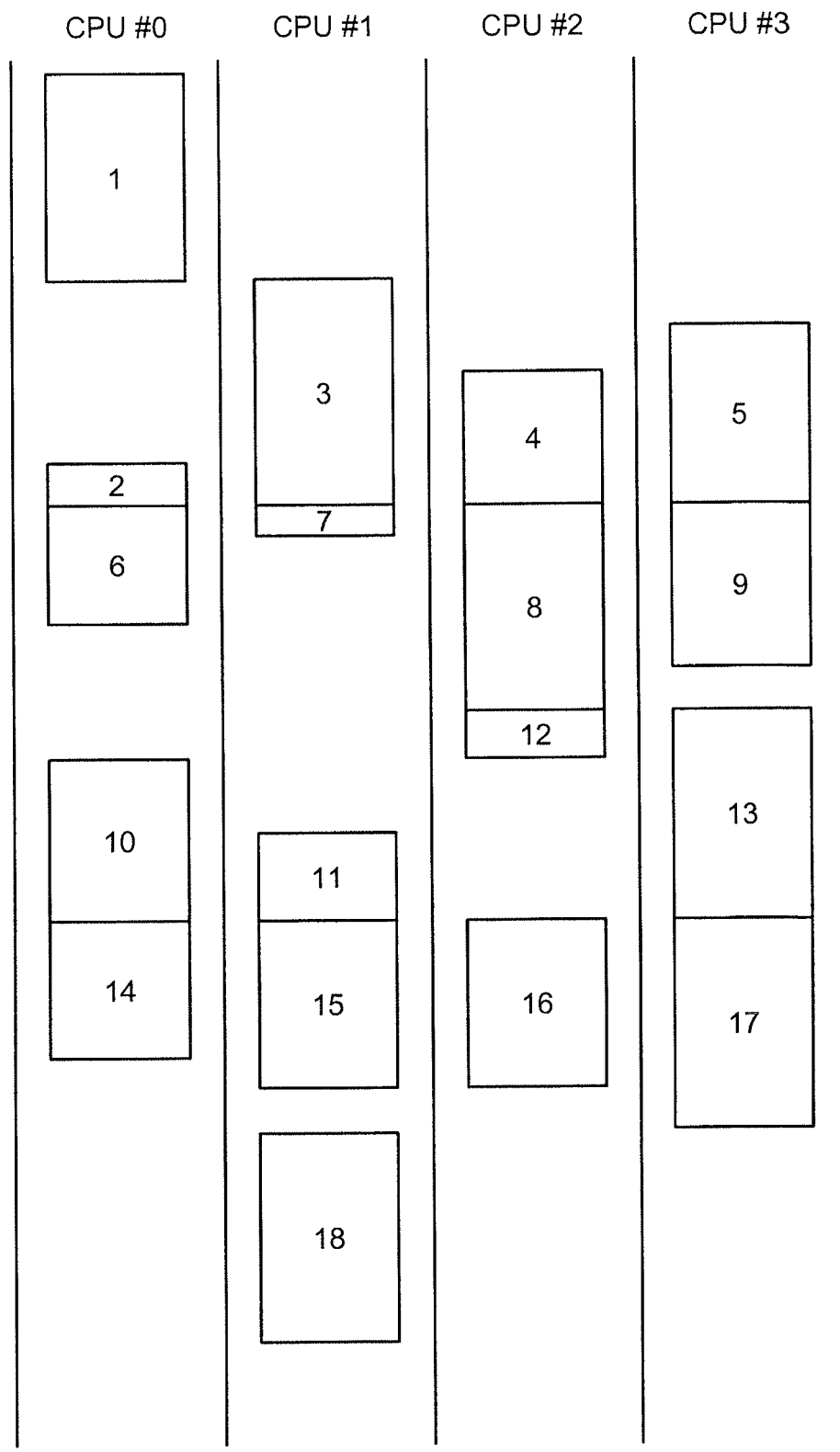
FIG. 20 is an explanatory diagram of a result of execution (by four cores) of the group 2 of the threads.

FIG. 20 is an explanatory diagram of the result of execution (by the four cores) of the group 2 of the threads. When the multi-core processor system 100 including the four cores executes the group 2 of the threads as in the second execution example, the scheduling is executed for the order depicted in FIG. 20.

The threads ID1 to ID9 are scheduled to be executed at the same timing as in the first execution example. As to the other subsequent threads, the execution starting times of the threads ID10, ID11, and ID13 are scheduled relative to the execution ending time of the thread ID13. As a result, the threads ID10, ID11, and ID13 come to an end at the same time (with the thread ID12 that already comes to an end) and therefore, the scheduler 200 executes scheduling for the threads ID14 to ID17, which are the subsequent threads of the threads ID10, ID11, ID12, and ID13, so that the threads ID14 to ID17 are executed without sandwiching any standby time period after the end of the threads ID10, ID11, ID12, and ID13.

In a third execution example, exemplary execution will be described for a case where plural groups of threads are allocated to one core. In the first and the second execution examples, a case has been described where one group of threads is allocated to one core. However, in the third execution example, a case will be described where the number of cores is smaller than the number of groups and plural groups are allocated to one core. For example, a case will be described where threads having the dependence relation as depicted in FIG. 8 are executed by two cores.

Figure 21:
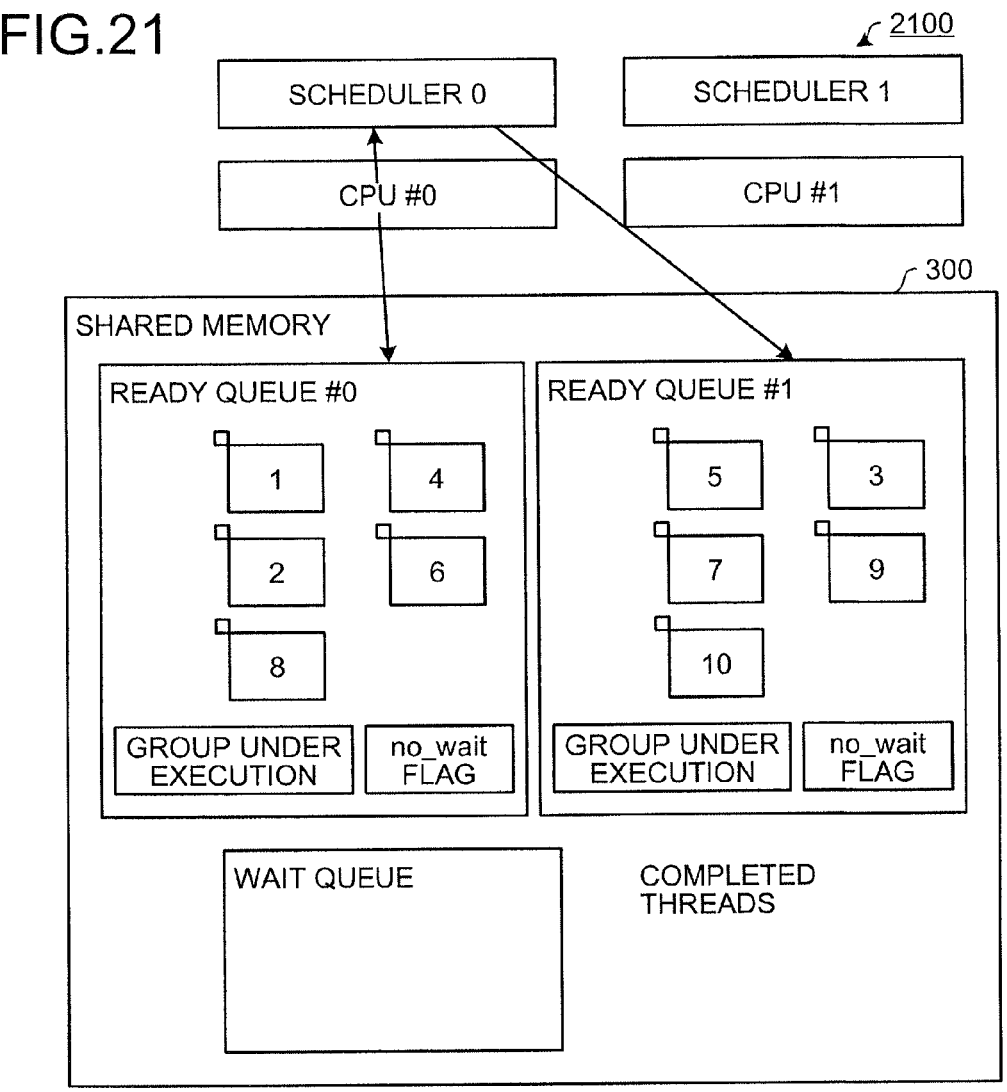
FIG. 21 is a diagram of an example of queue allocation for the group 1 of the threads when the number of cores is small.

FIG. 21 is a diagram of an example of queue allocation for the group 1 of the threads when the number of cores is small. In the third execution example, a multi-core processor system 2100 executes the allocation process of FIG. 8 and thereby, the threads belonging to groups 1 and 3 are allocated to the core #0 and those belonging to groups 2 and 4 are allocated to the core #1, as depicted in FIG. 21.

Similar to the first execution and the second examples, in the third execution example, the thread ID1 is scheduled to be executed by the core #0 as the preceding process. When the thread ID1 comes to an end, two threads of the thread ID2 belonging to the group 1 and the thread ID4 belonging to the group 3 become executable by the core #0.

Therefore, the scheduler 200 first selects the group to be executed by the core #0. For example, the scheduler 200 follows the route 1-1 of FIG. 14 and the route 2-3 of FIG. 15 and selects the group 3 whose total execution time period is long, and sets the delay time period of the thread ID4 that is executable in the group 3.

However, the same core as that for the thread ID4 is allocated with the thread ID2 among the preceding threads of the thread ID8 that is the subsequent thread of the thread ID4 in the same group. Therefore, the scheduler 200 can not execute consecutively the threads ID4 and ID8 in any way. The scheduler 200 follows a route 3-7 of FIG. 16 and sets the thread ID4 not to be delayed but to be executed immediately.

Because no executable thread remains in the group when the thread ID4 comes to an end, the scheduler 200 follows the route 1-5 of FIG. 14 and the route 2-3 of FIG. 15 and, after the group under execution is changed to the group 1, sets the delayed start up for the thread ID2. The longest estimated processing time period of the unexecuted threads is that of the thread ID3 among the preceding threads of the thread ID6 to be the subsequent thread of the thread ID2 in the same group. Therefore, the scheduler 200 changes the condition for the thread ID2 to be executable to the start of execution of thread ID3.

The execution of the thread ID3 is started at the time at which the thread ID5 comes to an end. Therefore, the thread ID2 again becomes executable and therefore, the scheduler 200 sets "the estimated processing time period of the thread ID3−the estimated processing time period of the thread ID2 (the result of a subtraction process)" to be the delay time period.

The no_wait flag is set for each of the threads ID6 and ID7. Therefore, the scheduler 200 can cause these threads to be executed immediately. The threads ID8 and ID9 do not belong to the same group as that of the thread ID10 to be the subsequent thread and therefore, the scheduler 200 can cause the threads ID8 and ID9 to be executed immediately after the threads ID6 and ID7 come to an end.

Figure 22:
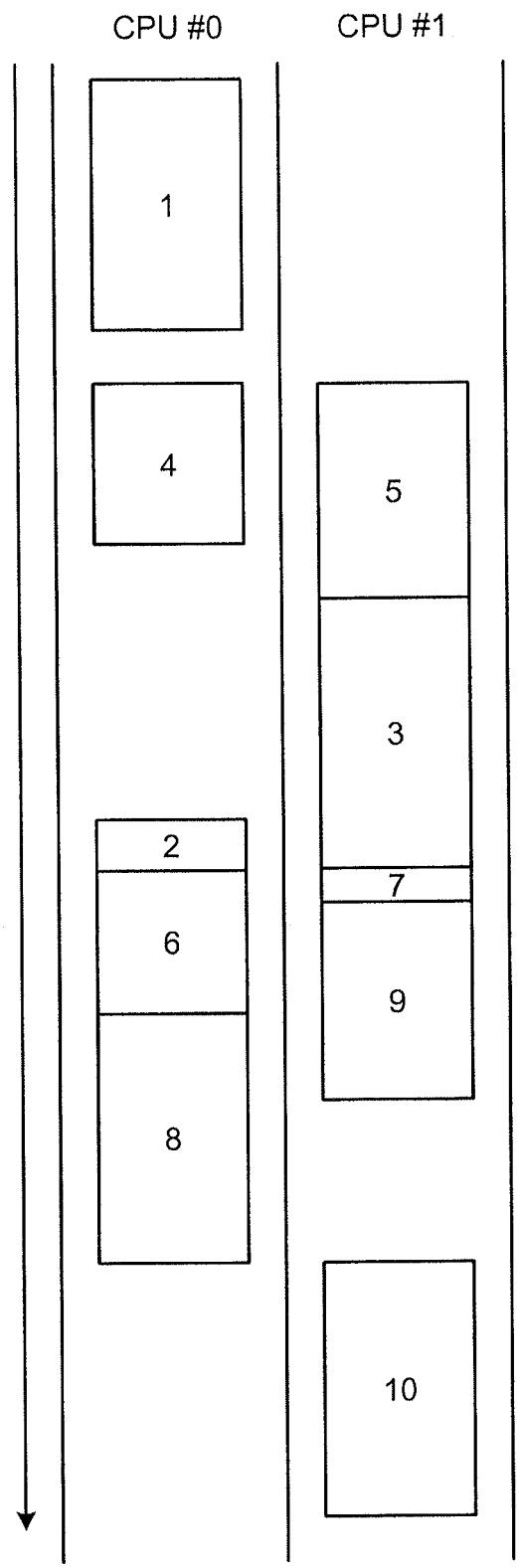
FIG. 22 is an explanatory diagram of a result of execution of the group 1 of the threads by a multi-core processor system whose number of cores is small (two cores)
Figure 23:
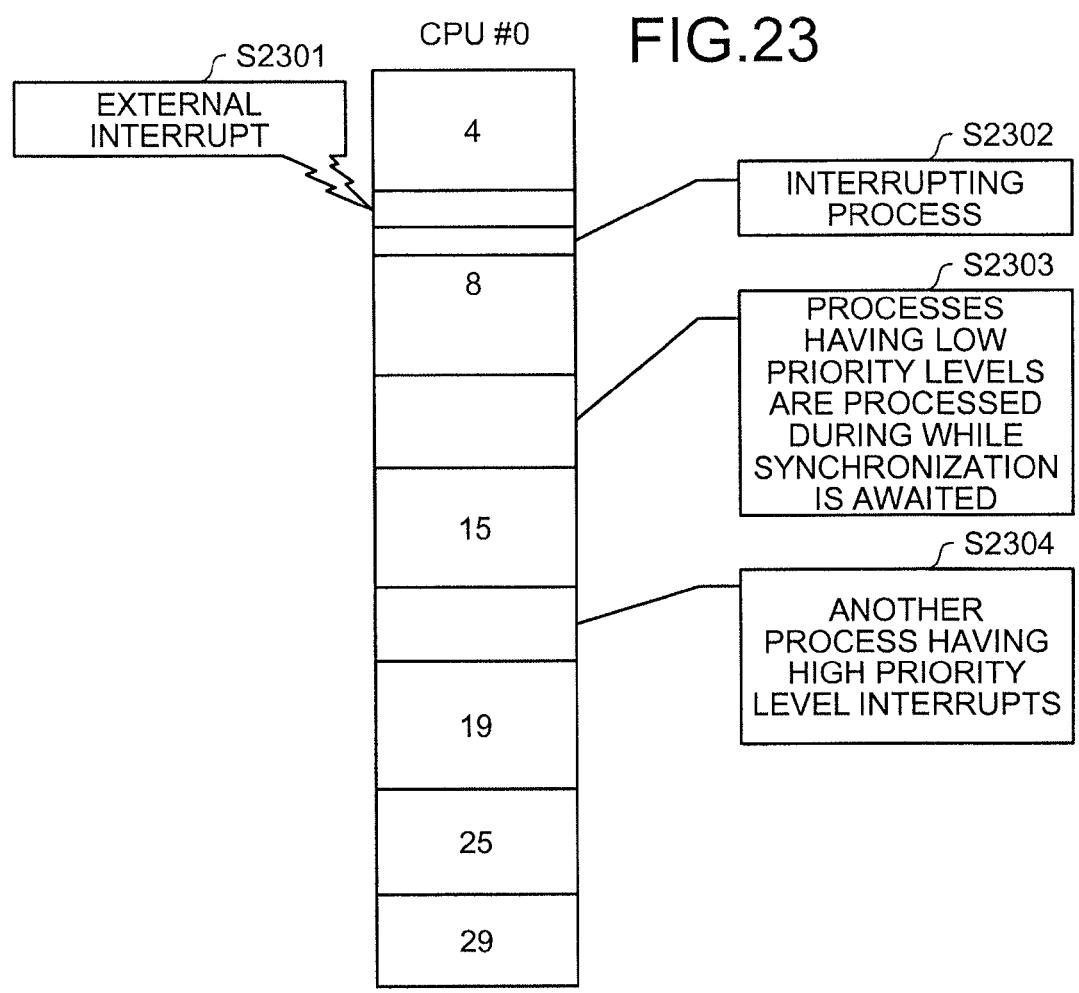
FIG. 23 is an explanatory diagram of the conventional consecutive execution of processes.

FIG. 22 is an explanatory diagram of the result of execution of the group 1 of the threads by a multi-core processor system whose number of cores is small (two cores). When the multi-core processor 2100 including the two cores executes the group 1 of the threads as in the third execution example, scheduling is executed for the order depicted in FIG. 22. When threads of plural groups are allocated to one core as in the third execution example, the scheduler 200 executes scheduling to consecutively execute, as many as possible, the threads of the same group.

As described, according to the scheduler, the multi-core processor system, and the scheduling method, when an unset process for which no scheduling is completed is not executable immediately after the preceding process executed by the same core comes to an end, the execution starting time of the unset process can be set for the unset process and the subsequent process to be consecutively executed. Therefore, occurrence of any standby time period can be avoided between the unset process and the subsequent process, and the processing efficiency of the core can be improved.

According to the above technique, when an unset process for which no scheduling is completed is executable immediately after the preceding process executed by the same core comes to an end, the execution starting time of the unset process can be set for the unset process and the preceding process to consecutively be executed. Therefore, occurrence of any standby time period can be avoided between the unset process and the preceding process, and the processing efficiency of the core can be improved.

According to the above technique, when no preceding process belonging to the same group is present, the unset process can be allocated to a core in an empty state that currently executes no process. When no core in an empty state is present, the unset process can be allocated to the core whose load is the lightest taking into consideration the execution time period of the processes allocated to the core. Therefore, the loads to the cores are distributed and therefore, efficient processing can be realized.

According to the above technique, such processes can be allocated to a core set with priority as a process whose priority level is high, an interrupt process, and a process to which no dependence information is appended that indicates the preceding and the subsequent processes, etc. Therefore, a process whose priority level is high is executed by a specific core. Therefore, occurrence of any interrupt process can be prevented during the consecutive execution and any cache-miss can be suppressed.

According to the above technique, even in the case where any standby time period occurs due to the scheduling, when the standby time period is shorter than a predetermined value (for which an arbitrary threshold value can be set), a setting can be made not to execute any process of any other program as in the conventional case. Therefore, such state can be prevented where the data stored in the cache is changed due to the occurrence of a standby time period. Coordination can be executed not to degrade the level of the processing efficiency of the core to be lower than a necessary level by limiting the standby time periods to shorter ones.

The scheduling method described in the present embodiment may be implemented by executing a prepared program on a computer such as a personal computer and a workstation. The program is stored on a computer-readable recording medium such as a hard disk, a flexible disk, a CD-ROM, an MO, and a DVD, read out from the computer-readable medium, and executed by the computer. The program may be distributed through a network such as the Internet.

According to the scheduler, the multi-core processor system, and the scheduling method, an effect is achieved that the cache can efficiently be used by reducing the occurrence of the standby time period.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A scheduler causing a specific core in a multi-core processor to execute a process comprising:
    first detecting, by the specific core, from a group of processes constituting a program to be executed, a group of unset scheduling processes whose group of subsequent processes is common;
    second detecting, by the specific core, for each of the unset scheduling processes of the detected group of unset scheduling processes and from a group of preceding processes for the unset scheduling processes, a preceding process belonging to a group to which the unset scheduling processes of the detected group of unset scheduling processes belong, the group to which the unset scheduling process belongs being among groups formed by grouping processes that share same or related data to be accessed;
    allocating, by the specific core, each of the unset scheduling processes of the detected group of unset scheduling processes respectively to a core in the multi-core processor and to which the detected preceding process is allocated;
    calculating, by the specific core, for each of the unset scheduling processes of the detected group of unset scheduling processes, elapsed time of an execution time period of each of the unset scheduling processes of the detected group of unset scheduling processes from an execution ending time at which the group of preceding processes for the unset scheduling processes of the detected group of unset scheduling processes completely ends; and
    setting, by the specific core, for each of the allocated unset scheduling processes, an execution starting time of each of the allocated unset scheduling process at an allocation destination core such that an execution of a respective unset scheduling process is to be completed at a most recent calculated elapsed time;
    wherein the allocating includes allocating an interrupt process consequent to the program to be executed and a second program is allocated, to a core for which no preceding process belonging to the group to which a respective unset scheduling process of the detected group of unset scheduling processes belongs is detected at the second detecting.

2. The scheduler according to claim 1, wherein
the setting includes setting, when the detected preceding process ends at an execution ending time at which the group of preceding processes of the unset scheduling process completely ends, the execution ending time to be the execution starting time of the unset scheduling process.

3. The scheduler according to claim 1, wherein
the allocating includes allocating, when no preceding process belonging to a group to which the unset scheduling process belongs is detected, the unset scheduling process for which no preceding process is detected, to a core that is in the multi-core processor and to which no preceding process is allocated.

4. The scheduler according to claim 3, wherein
the allocating includes allocating, when no preceding process belonging to the group to which the unset scheduling process belongs is detected and preceding processes have been allocated to all cores in the multi-core processor, the unset scheduling process for which no preceding process is detected is allocated to a core that is in the multi-core processor and whose execution time period of the preceding process allocated thereto is shortest.

5. The scheduler according to claim 1, wherein
the allocating includes allocating, when a priority level concerning order of execution is set for the unset scheduling process and the priority level is set high among the unset scheduling processes, the unset scheduling process is allocated preferentially to the core to which the detected preceding process is allocated.

6. The scheduler according to claim 1, wherein
the allocating includes allocating, when the preceding processes have been allocated to all cores in the multi-core processor, the interrupt process to a core whose execution time period of the preceding process already allocated thereto is shortest.

7. The scheduler according to claim 1, wherein
the allocating includes allocating a process that is in the groups of processes constituting the program to be executed and does not have information identifying the group of subsequent processes and the group of preceding processes, to a core for which no preceding process belonging to the group to which the unset scheduling process belongs is detected at the second detecting.

8. The scheduler according to claim 7, wherein
the allocating includes allocating, when the preceding processes have been allocated to all cores in the multi-core processor, the process not having information identifying the group of subsequent processes and the group of preceding processes, to a core whose execution time period of the preceding process already allocated thereto is shortest.

9. The scheduler according to claim 1, wherein
the setting includes setting, when a standby time period from the ending time of the preceding process of the detected unset scheduling process to the set execution starting time of the unset scheduling process is greater than or equal to a threshold value, the ending time of the preceding process of the unset scheduling process to be an execution starting time of a process whose execution time period is less than or equal to the standby time period, among processes of a second program.

10. A system comprising a multi-core processor that:
detects, using a specific core of the multi-core processor, from a group of processes constituting a program to be executed, a group of unset scheduling processes whose group of subsequent processes is common;
detects, using the specific core, for each of the unset scheduling processes of the detected group of unset scheduling processes and from a group of preceding processes for the unset scheduling processes, a preceding process belonging to a group to which the unset scheduling processes of the detected group of unset scheduling processes belong, the group to which the unset scheduling process belongs being among groups formed by grouping the processes that share same or related data to be accessed;
allocates, using the specific core, each of the unset scheduling processes of the detected group of unset scheduling processes respectively to a core in the multi-core processor and to which the detected preceding process is allocated;
calculates, using the specific core, for each of the unset scheduling processes of the detected group of unset scheduling processes, elapsed time of an execution time period of each of the unset scheduling processes of the detected group of unset scheduling processes from an execution ending time at which the group of preceding processes for the unset scheduling processes of the detected group of unset scheduling processes completely ends; and
sets, using the specific core, for each of the allocated unset scheduling processes, an execution starting time of each of the allocated unset scheduling process at an allocation destination core such that an execution of a respective unset scheduling process is to be completed at a most recent calculated elapsed time;
wherein the allocation includes allocating an interrupt process consequent to the program to be executed and a second program is allocated, to a core for which no preceding process belonging to the group to which a respective unset scheduling process of the detected group of unset scheduling processes belongs is detected at the second detecting.

11. A scheduling method executed by a specific core in a multi-core processor, the scheduling method comprising:
first detecting from a group of processes constituting a program to be executed, a group of unset scheduling processes whose group of subsequent processes is common;
second detecting for each of the unset scheduling processes of the detected group of unset scheduling processes and from a group of preceding processes for the unset scheduling processes, a preceding process belonging to a group to which the unset scheduling processes of the detected group of unset scheduling belong, the group to which the unset scheduling process belongs being among groups formed by grouping the processes that share same or related data to be accessed;
allocating each of the unset scheduling processes of the detected group of unset scheduling processes respectively to a core in the multi-core processor and to which the detected preceding process is allocated;
calculating, for each of the unset scheduling processes of the detected group of unset scheduling processes, elapsed time of an execution time period of each of the unset scheduling processes of the detected group of unset scheduling processes from an execution ending time at which the group of preceding processes for the unset scheduling processes of the detected group of unset scheduling processes completely ends; and
setting, for each of the allocated unset scheduling processes, an execution starting time of each of the allocated unset scheduling process at an allocation destination core such that an execution of the unset scheduling process is to be completed at a most recent calculated elapsed time;
wherein the allocating includes allocating an interrupt process consequent to the program to be executed and a second program is allocated, to a core for which no preceding process belonging to the group to which a respective unset scheduling process of the detected group of unset scheduling processes belongs is detected at the second detecting.

* * * * *